United States Patent
Rugeland et al.

(10) Patent No.: US 12,256,257 B2
(45) Date of Patent: Mar. 18, 2025

(54) EARLY MEASUREMENT REPORTING OF SUSPENDED SECONDARY CELL GROUP (SCG)

(71) Applicant: Telefonaktiebolaget LM Ericsson (publ), Stockholm (SE)

(72) Inventors: Patrik Rugeland, Bromma (SE); Lian Araujo, Solna (SE); Oumer Teyeb, Montréal (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 447 days.

(21) Appl. No.: 17/769,224

(22) PCT Filed: Oct. 28, 2020

(86) PCT No.: PCT/SE2020/051043
§ 371 (c)(1),
(2) Date: Apr. 14, 2022

(87) PCT Pub. No.: WO2021/101428
PCT Pub. Date: May 27, 2021

(65) Prior Publication Data
US 2023/0262501 A1 Aug. 17, 2023

Related U.S. Application Data

(60) Provisional application No. 62/938,167, filed on Nov. 20, 2019.

(51) Int. Cl.
*H04W 24/10* (2009.01)
*H04W 76/27* (2018.01)
(52) U.S. Cl.
CPC ........... *H04W 24/10* (2013.01); *H04W 76/27* (2018.02)

(58) Field of Classification Search
CPC .............................. H04W 24/10; H04W 76/27
See application file for complete search history.

(56) References Cited

U.S. PATENT DOCUMENTS 10,667,323 B1 * 5/2020 Shih ...................... H04W 76/27
2020/0404521 A1 * 12/2020 Kim ...................... H04W 24/08
(Continued)

FOREIGN PATENT DOCUMENTS

WO 2018174791 A1 9/2018
WO 2020109651 A1 6/2020

OTHER PUBLICATIONS

"3GPP TS 33.401 V15.9.0", 3rd Generation Partnership Project; Technical Specification Group Services and System Aspects; 3GPP System Architecture Evolution (SAE); Security architecture (Release 15), Sep. 2019, pp. 1-163.
(Continued)

*Primary Examiner* — Redentor Pasia
(74) *Attorney, Agent, or Firm* — Murphy, Bilak & Homiller, PLLC

(57) ABSTRACT

Embodiments include methods for a user equipment (UE) to perform measurements on a secondary cell group (SCG) in a wireless network while the SCG is suspended. Such methods include receiving, from a network node in the wireless network, a message including an indication that the SCG should be suspended and/or a first SCG measurement configuration to be used while the SCG is suspended. Such methods include suspending the SCG in response to the message, and performing measurements on the suspended SCG according to: the first SCG measurement configuration, when the first SCG measurement configuration was included in the message; or a second SCG measurement configuration applicable before the SCG was suspended, when the first SCG measurement configuration was not included in the message. Embodiments also include complementary meth-
(Continued)

ods for a network node, as well as UEs and network nodes configured to perform such methods.

20 Claims, 18 Drawing Sheets

(56) References Cited

U.S. PATENT DOCUMENTS

| | | | |
|---|---|---|---|
| 2021/0051506 A1* | 2/2021 | Lee | H04W 48/10 |
| 2021/0352750 A1* | 11/2021 | Cheng | H04W 76/27 |
| 2022/0104301 A1* | 3/2022 | Wu | H04W 76/16 |
| 2022/0159483 A1* | 5/2022 | Lee | H04W 24/04 |
| 2022/0264466 A1* | 8/2022 | Al | H04L 5/0098 |
| 2022/0264686 A1* | 8/2022 | Tsai | H04W 74/0833 |
| 2022/0287124 A1* | 9/2022 | Ali | H04W 76/34 |
| 2022/0394583 A1* | 12/2022 | Deenoo | H04W 74/0841 |

OTHER PUBLICATIONS

"3GPP TS 23.501 V16.2.0", 3rd Generation Partnership Project; Technical Specification Group Services and System Aspects; System Architecture for the 5G System (5GS); Stage 2 (Release 16), Sep. 2019, pp. 1-391.
"Dormant SCG state", 3GPP TSG-RAN WG2 Meeting 107bis, R2-1912118, Chongqing, P.R.China, Oct. 14-18, 2019, pp. 1-4.
"3GPP TS 36.300 V15.7.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15), Sep. 2019, pp. 1-295.
"3GPP TS 36.331 V15.7.0", 3rd Generation Partnership Project; Technical Specification Group Radio Access Network; Evolved Universal Terrestrial Radio Access (E-UTRA); Radio Resource Control (RRC); Protocol specification (Release 15), Sep. 2019, pp. 1-962.
"3GPP TS 36.133 V16.3.0", 3rd Generation Partnership Project; Technical Specification Group Radio Access Network; Evolved Universal Terrestrial Radio Access (E-UTRA); Requirements for support of radio resource management (Release 16), Sep. 2019, pp. 1-3732.
"3GPP TS 38.331 V15.7.0", 3rd Generation Partnership Project; Technical Specification Group Radio Access Network; NR; Radio Resource Control (RRC) protocol specification (Release 15), Sep. 2019, pp. 1-527.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"3GPP TS 23.401 V16.4.0", 3rd Generation Partnership Project; Technical Specification Group Services and System Aspects; General Packet Radio Service (GPRS) enhancements for Evolved Universal Terrestrial Radio Access Network (E-UTRAN) access (Release 16), Sep. 2019, pp. 1-424.
"3GPP TS 36.321 V15.7.0", 3rd Generation Partnership Project; Technical Specification Group Radio Access Network; Evolved Universal Terrestrial Radio Access (E-UTRA); Medium Access Control (MAC) protocol specification (Release 15), Sep. 2019, pp. 1-134.

* cited by examiner

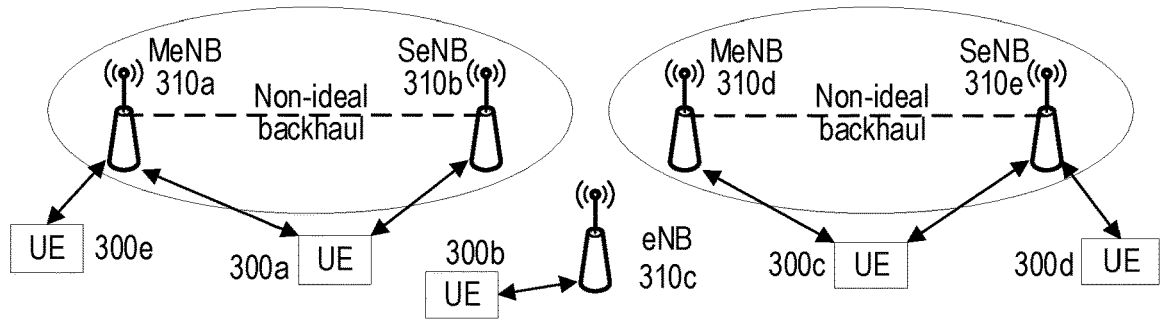

FIG. 3

```
-- ASN1START
RRCConnectionRelease ::=           SEQUENCE {
    rrc-TransactionIdentifier       RRC-TransactionIdentifier,
    criticalExtensions              CHOICE {
        c1                          CHOICE {
            rrcConnectionRelease-r8     RRCConnectionRelease-r8-IEs,
            spare3 NULL, spare2 NULL, spare1 NULL
        },
        criticalExtensionsFuture    SEQUENCE {}
    }
}
...
RRCConnectionRelease-v1530-IEs ::= SEQUENCE {
    drb-ContinueROHC-r15            ENUMERATED {true}       OPTIONAL,   -- Cond UP-EDT
    nextHopChainingCount-r15        NextHopChainingCount    OPTIONAL,   -- Cond UP-EDT
    measIdleConfig-r15              MeasIdleConfigDedicated-r15
                                                            OPTIONAL,   -- Need ON
    rrc-InactiveConfig-r15          RRC-InactiveConfig-r15  OPTIONAL,   -- Need OR
    cn-Type-r15                     ENUMERATED {epc,fivegc} OPTIONAL,   -- Need OR
    nonCriticalExtension            SEQUENCE {}             OPTIONAL
}
-- ASN1STOP
```

FIG. 4A

```
-- ASN1START
MeasIdleConfigSIB-r15 ::= SEQUENCE {
    measIdleCarrierListEUTRA-r15 EUTRA-CarrierList-r15,
    ...
}
MeasIdleConfigDedicated-r15 ::= SEQUENCE {
    measIdleCarrierListEUTRA-r15   EUTRA-CarrierList-r15    OPTIONAL,   -- Need OR
    measIdleDuration-r15    ENUMERATED {sec10, sec30, sec60, sec120,
                                        sec180, sec240, sec300, spare},
    ...
}
EUTRA-CarrierList-r15 ::= SEQUENCE (SIZE (1..maxFreqIdle-r15)) OF
                                        MeasIdleCarrierEUTRA-r15
MeasIdleCarrierEUTRA-r15::=      SEQUENCE {
    carrierFreq-r15                 ARFCN-ValueEUTRA-r9,
    allowedMeasBandwidth-r15        AllowedMeasBandwidth,
    validityArea-r15                CellList-r15            OPTIONAL,   -- Need OR
    measCellList-r15                CellList-r15            OPTIONAL,   -- Need OR
    reportQuantities                ENUMERATED {rsrp, rsrq, both},
    qualityThreshold-r15            SEQUENCE {
        idleRSRP-Threshold-r15          RSRP-Range          OPTIONAL,   -- Need OR
        idleRSRQ-Threshold-r15          RSRQ-Range-r13      OPTIONAL    -- Need OR
    }                                                       OPTIONAL,   -- Need OR
    ...
}
CellList-r15 ::=      SEQUENCE (SIZE (1.. maxCellMeasIdle-r15)) OF PhysCellIdRange
-- ASN1STOP
```

FIG. 4B

```
RRCConnectionSetupComplete-v1530-IEs ::=    SEQUENCE {
    logMeasAvailableBT-r15              ENUMERATED {true}           OPTIONAL,
    logMeasAvailableWLAN-r15            ENUMERATED {true}           OPTIONAL,
    idleMeasAvailable-r15               ENUMERATED {true}           OPTIONAL,
    flightPathInfoAvailable-r15         ENUMERATED {true}           OPTIONAL,
    connectTo5GC-r15                    ENUMERATED {true}           OPTIONAL,
    registeredAMF-r15                   RegisteredAMF-r15           OPTIONAL,
    s-NSSAI-list-r15                    SEQUENCE(SIZE (1..maxNrofS-NSSAI-r15))
                                                OF S-NSSAI-r15     OPTIONAL,
    ng-5G-S-TMSI-Bits-r15               CHOICE {
        ng-5G-S-TMSI-r15                    NG-5G-S-TMSI-r15,
        ng-5G-S-TMSI-Part2-r15              BIT STRING (SIZE (8))
    }                                                               OPTIONAL,
    nonCriticalExtension                RRCConnectionSetupComplete-v1540-IEs   OPTIONAL
}
```

FIG. 5A

```
RRCConnectionResumeComplete-v1530-IEs   ::= SEQUENCE {
    logMeasAvailableBT-r15              ENUMERATED {true}           OPTIONAL,
    logMeasAvailableWLAN-r15            ENUMERATED {true}           OPTIONAL,
    idleMeasAvailable-r15               ENUMERATED {true}           OPTIONAL,
    flightPathInfoAvailable-r15         ENUMERATED {true}           OPTIONAL,
    nonCriticalExtension                SEQUENCE {}                 OPTIONAL
}
```

FIG. 5B

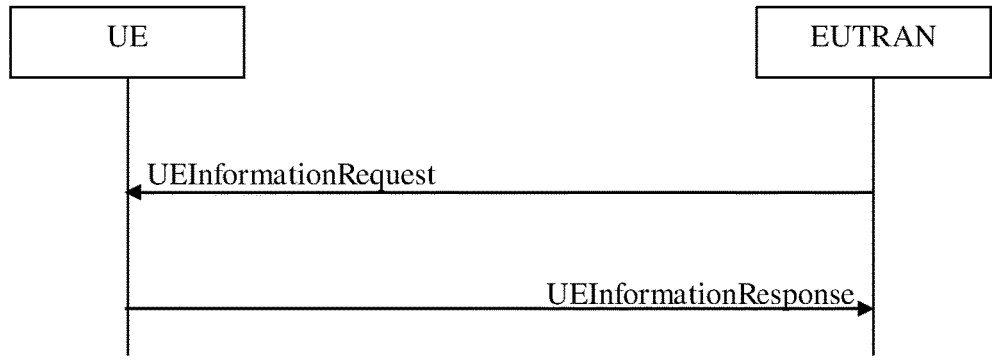

FIG. 5C

```
-- ASN1START
UEInformationResponse-r9 ::=        SEQUENCE {
    rrc-TransactionIdentifier           RRC-TransactionIdentifier,
    criticalExtensions                  CHOICE {
        c1                                  CHOICE {
            ueInformationResponse-r9            UEInformationResponse-r9-IEs,
            spare3 NULL, spare2 NULL, spare1 NULL
        },
        criticalExtensionsFuture            SEQUENCE {}
    }
}
UEInformationResponse-v1530-IEs ::= SEQUENCE {
    measResultListIdle-r15              MeasResultListIdle-r15      OPTIONAL,
    flightPathInfoReport-r15            FlightPathInfoReport-r15    OPTIONAL,
    nonCriticalExtension                SEQUENCE {}                 OPTIONAL
}
```

FIG. 5D

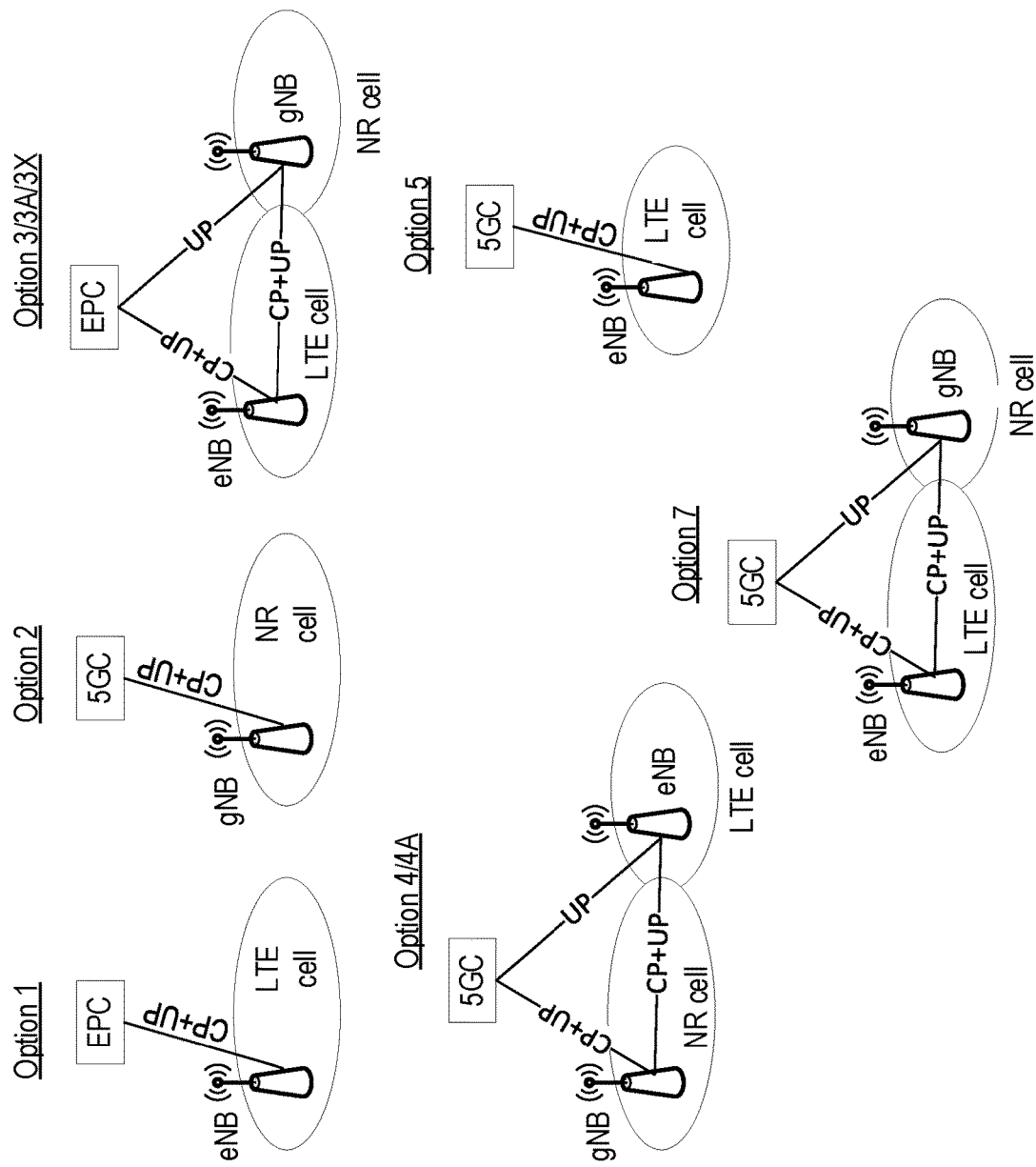

```
-- ASN1START
-- TAG-RRCRECONFIGURATION-START

RRCReconfiguration ::=              SEQUENCE {
    rrc-TransactionIdentifier           RRC-TransactionIdentifier,
    criticalExtensions                  CHOICE {
        rrcReconfiguration                  RRCReconfiguration-IEs,
        criticalExtensionsFuture            SEQUENCE {}
    }
}

RRCReconfiguration-IEs ::=          SEQUENCE {
    radioBearerConfig                   RadioBearerConfig                                           OPTIONAL,   -- Need M
    secondaryCellGroup                  OCTET STRING (CONTAINING CellGroupConfig)                   OPTIONAL,   -- Need M
    measConfig                          MeasConfig                                                  OPTIONAL,   -- Need M
    lateNonCriticalExtension            OCTET STRING                                                OPTIONAL,
    nonCriticalExtension                RRCReconfiguration-v1530-IEs                                OPTIONAL
}

...
RRCReconfiguration-v1560-IEs ::=    SEQUENCE {
    mrdc-SecondaryCellGroupConfig       SetupRelease { MRDC-SecondaryCellGroupConfig }              OPTIONAL,   -- Need M
    radioBearerConfig2                  OCTET STRING (CONTAINING RadioBearerConfig)                 OPTIONAL,   -- Need M
    sk-Counter                          SK-Counter                                                  OPTIONAL,   -- Need N
    nonCriticalExtension                RRCReconfiguration-v16xx-IEs                                OPTIONAL
}

RRCReconfiguration-v16xx-IEs ::=    SEQUENCE {
    suspendSCG                          BOOLEAN                                                     OPTIONAL,   -- Need M
    suspendedSCG-measConfig             SetupRelease {MeasIdleConfigDedicated-r16}                  OPTIONAL,   -- Need M
    nonCriticalExtension                SEQUENCE {}                                                 OPTIONAL
}

...
-- TAG-RRCRECONFIGURATION-STOP
-- ASN1STOP
```

FIG. 10

```
MeasIdleConfigDedicated-r16 ::= SEQUENCE {
    measIdleCarrierListNR-r16        NR-CarrierList-r16         OPTIONAL,   -- Need FFS
    measIdleCarrierListEUTRA-r16     EUTRA-CarrierList-r16      OPTIONAL,   -- Need FFS
    measIdleDuration-r16             FFS-Value,
    ...
}
NR-CarrierList-r16     ::=    SEQUENCE (SIZE (1..maxFreqIdle-r16)) OF MeasIdleCarrierNR-r16
EUTRA-CarrierList-r16  ::=    SEQUENCE (SIZE (1..maxFreqIdle-r16)) OF MeasIdleCarrierEUTRA-r16
MeasIdleCarrierNR-r16  ::=    SEQUENCE {
    carrierFreqNR-r16                ARFCN-ValueNR,
    measCellListNR-r16               CellListNR-r16             OPTIONAL,   -- Need FFS
    reportQuantities-r16             ENUMERATED {rsrp, rsrq, both},
    qualityThreshold-r16             SEQUENCE {
        idleRSRP-Threshold-NR-r16 RSRP-Range                    OPTIONAL,   -- Need FFS
        idleRSRQ-Threshold-NR-r16 RSRQ-Range                    OPTIONAL    -- Need FFS
    }                                                           OPTIONAL,   -- Need FFS
    ssbMeasConfig-r16                SEQUENCE {
        frequencyBandList                MultiFrequencyBandListNR   OPTIONAL,
        nrofSS-BlocksToAverage-r16       INTEGER (2..maxNrofSS-BlocksToAverage)
                                                                OPTIONAL,   -- Need FFS
        absThreshSS-BlocksConsolidation-r16 ThresholdNR         OPTIONAL,   -- Need FFS
        smtc-r16                         SSB-MTC                OPTIONAL,   -- Need FFS
        ssbSubcarrierSpacing-r16         SubcarrierSpacing,
        ssb-ToMeasure-r16                SSB-ToMeasure          OPTIONAL,   -- Need FFS
        deriveSSB-IndexFromCell-r16      BOOLEAN,
        ss-RSSI-Measurement-r16          SS-RSSI-Measurement    OPTIONAL
    }                                                           OPTIONAL,   -- Cond FFS
    beamMeasConfigIdle-r16           BeamMeasConfigIdle-NR-r16  OPTIONAL,   -- Need FFS
    ...
}
MeasIdleCarrierEUTRA-r16 ::=     SEQUENCE {
    carrierFreqEUTRA-r16             ARFCN-ValueEUTRA,
    allowedMeasBandwidth-r16         EUTRA-AllowedMeasBandwidth,
    measCellListEUTRA-r16            CellListEUTRA-r16          OPTIONAL,   -- Need FFS
    reportQuantities-r16             ENUMERATED {rsrp, rsrq, both},
    qualityThreshold-r16             SEQUENCE {
        idleRSRP-Threshold-EUTRA-r16     RSRP-RangeEUTRA        OPTIONAL,   -- Need FFS
        idleRSRQ-Threshold-EUTRA-r16     RSRQ-RangeEUTRA-r16    OPTIONAL    -- Need FFS
    }                                                           OPTIONAL,   -- Need FFS
    ...
}
CellListNR-r16    ::=     SEQUENCE (SIZE (1..maxCellMeasIdle-r16)) OF PCI-Range
CellListEUTRA-r16 ::=     SEQUENCE (SIZE (1..maxCellMeasIdle-r16)) OF EUTRA-PhysCellIdRange
BeamMeasConfigIdle-NR-r16 ::=    SEQUENCE {
    reportQuantityRS-Indexes-r16     ENUMERATED {rsrp, rsrq, both} OPTIONAL,  -- Need FFS
    maxNrofRS-IndexesToReport-r16    INTEGER (1..FFS)              OPTIONAL,  -- Need FFS
    includeBeamMeasurements-r16      ENUMERATED {true}             OPTIONAL,  -- Need R
}
RSRQ-RangeEUTRA-r16 ::=   INTEGER (-30..46)
```

FIG. 11

```
-- ASN1START
-- TAG-UEASSISTANCEINFORMATION-START

UEAssistanceInformation ::=        SEQUENCE {
    criticalExtensions                 CHOICE {
        ueAssistanceInformation            UEAssistanceInformation-IEs,
        criticalExtensionsFuture           SEQUENCE {}
    }
}
UEAssistanceInformation-IEs ::=    SEQUENCE {
    delayBudgetReport                  DelayBudgetReport                  OPTIONAL,
    lateNonCriticalExtension           OCTET STRING                       OPTIONAL,
    nonCriticalExtension               UEAssistanceInformation-v1540-IEs  OPTIONAL
}
...
UEAssistanceInformation-v1540-IEs ::= SEQUENCE {
    overheatingAssistance              OverheatingAssistance              OPTIONAL,
    nonCriticalExtension               UEAssistanceInformation-v16xx-IEs  OPTIONAL
}
UEAssistanceInformation-v16xx-IEs ::= SEQUENCE {
    resumeSCG-r16                      ENUMERATED {true}                  OPTIONAL,
    measResultIdleEUTRA-r16            MeasResultIdleEUTRA-r16            OPTIONAL,
    measResultIdleNR-r16               MeasResultIdleNR-r16               OPTIONAL,
    nonCriticalExtension               SEQUENCE {}                        OPTIONAL
}
```

FIG. 12

```
RRCReconfiguration-v1560-IEs ::=    SEQUENCE {
    mrdc-SecondaryCellGroupConfig       SetupRelease { MRDC-SecondaryCellGroupConfig }  OPTIONAL,   -- Need M
    radioBearerConfig2                  OCTET STRING (CONTAINING RadioBearerConfig)     OPTIONAL,   -- Need M
    sk-Counter                          SK-Counter                                       OPTIONAL,   -- Need N
    nonCriticalExtension                RRCReconfiguration-v16xx-IEs                     OPTIONAL
}

RRCReconfiguration-v16xx-IEs ::=    SEQUENCE {
    suspendSCG-MeasurementReq           ENUMERATED {true}                                OPTIONAL,   -- Need M
    nonCriticalExtension                SEQUENCE {}                                      OPTIONAL
}

...
-- TAG-RRCRECONFIGURATION-STOP
-- ASN1STOP
```

FIG. 13A

```
-- ASN1START
-- TAG-RRCRECONFIGURATIONCOMPLETE-START
RRCReconfigurationComplete ::=  SEQUENCE {
    rrc-TransactionIdentifier           RRC-TransactionIdentifier,
    criticalExtensions                  CHOICE {
        rrcReconfigurationComplete          RRCReconfigurationComplete-IEs,
        criticalExtensionsFuture            SEQUENCE {}
    }
}

RRCReconfigurationComplete-IEs ::=  SEQUENCE {
    lateNonCriticalExtension            OCTET STRING                                                        OPTIONAL,
    nonCriticalExtension                RRCReconfigurationComplete-v1530-IEs                                OPTIONAL
}

RRCReconfigurationComplete-v1560-IEs ::= SEQUENCE {
    scg-Response                        CHOICE {
        nr-SCG-Response                     OCTET STRING (CONTAINING RRCReconfigurationComplete),
        eutra-SCG-Response                  OCTET STRING
    }                                                                                                       OPTIONAL,
    nonCriticalExtension                RRCReconfigurationComplete-v16xx-IEs                                OPTIONAL
}

RRCReconfigurationComplete-v16xx-IEs ::= SEQUENCE {
    suspendedSCG-measResult-r16         CHOICE {
        nr-SCG-Result-r16                   MeasResultIdleNR-r16,
        eutra-SCG-Result-r16                MeasResultIdleEUTRA-r16
    }                                                                                                       OPTIONAL,
    OPTIONAL,
    nonCriticalExtension                SEQUENCE {}
}

-- TAG-RRCRECONFIGURATIONCOMPLETE-STOP
-- ASN1STOP
```

FIG. 13B

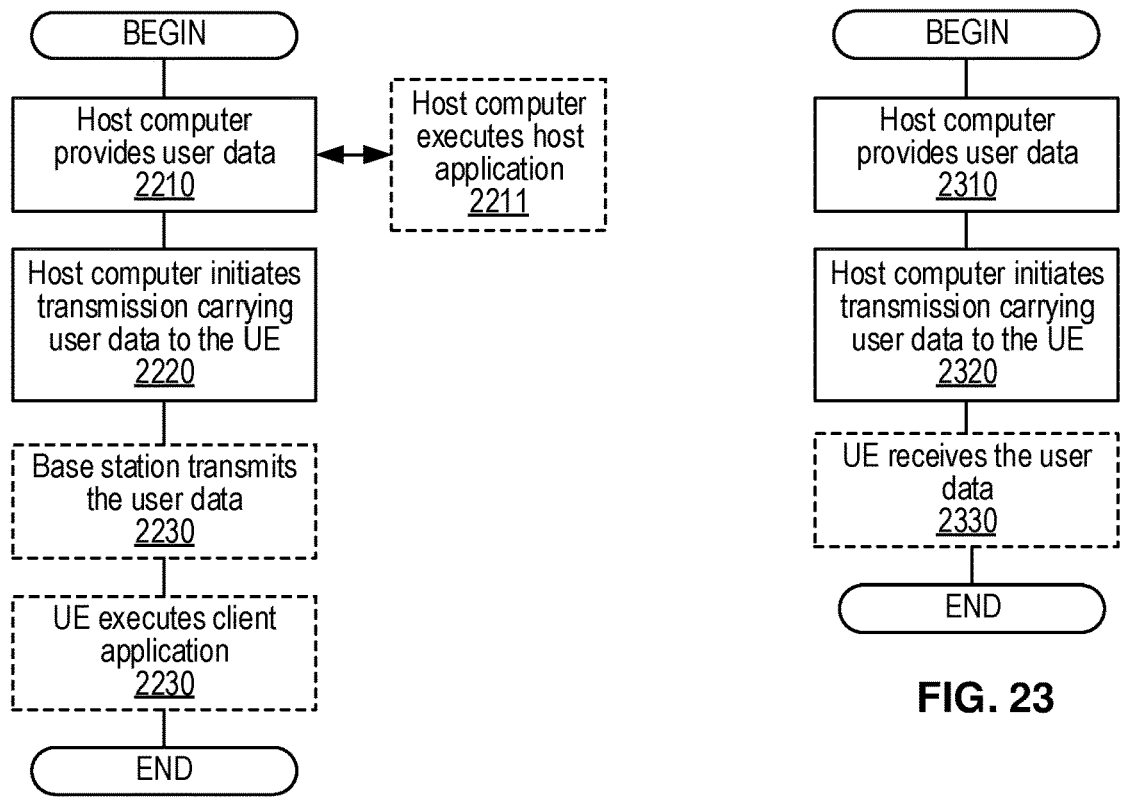
FIG. 22
FIG. 23
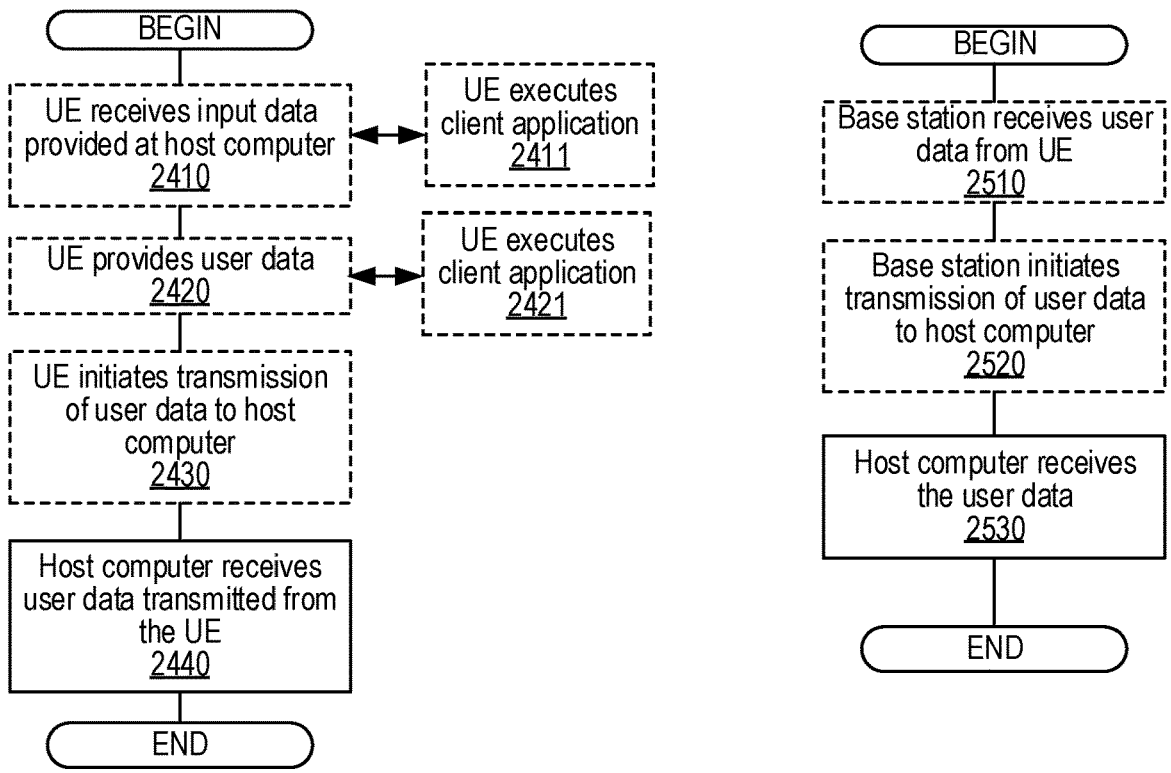
FIG. 24
FIG. 25

EARLY MEASUREMENT REPORTING OF SUSPENDED SECONDARY CELL GROUP (SCG)

TECHNICAL FIELD

The present application relates generally to the field of wireless communication systems, and more specifically to devices, methods, and computer-readable media that improve management of the states of a user equipment's (UE's) secondary serving cells (SCells) during suspension and resumption of the UE's connection with a cellular network.

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDIE state is known in the EPC and has an assigned IP address.

Furthermore, in RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state LTE Rel-10 adds support for bandwidths larger than 20 MHz, while remaining backward compatible with Rel-8. As such, a wideband LTE Rel-10 carrier (e.g., wider than 20 MHz) should appear as a number of carriers (referred to as "component carriers" or "CCs") to an LTE Rel-8 terminal. For an efficient use of a wideband Rel-10 carrier, legacy (e.g., Rel-8) terminals can be scheduled in all parts of the wideband LTE Rel-10 carrier. One way to achieve this is by Carrier Aggregation (CA), whereby an LTE Rel-10 terminal can receive multiple CCs, each preferably having the same structure as a Rel-8 carrier. Additionally, in the context of CA, the terms "carrier," "component carrier," (or CC, for short) and "cell" are often used interchangeably.

In the context of LTE, a primary serving cell (PCell) is defined as the "main" cell serving the wireless device such that both data and control signaling can be transmitted over the PCell, while one or more supplementary or secondary serving cells (SCells) are typically used for transmitting data only. For example, the SCell(s) provide(s) extra bandwidth to enable greater data throughput. A CA-capable UE is assigned a PCell that is always activated, and one or more SCells that can be activated or deactivated dynamically.

The number of aggregated CCs as well as the bandwidth of individual CCs can be different for UL and DL. A "symmetric configuration" refers to when the number of CCs in UL and DL are the same, whereas an "asymmetric configuration" refers to when the number of CCs in UL and DL are different. Furthermore, the number of CCs configured in a cell may be different from the number of CCs seen by a UE. For example, a UE can support more DL CCs than UL CCs, even though the cell is configured with the same number of UL CCs and DL CCs.

A dual connectivity (DC) framework was introduced in LTE Rel-12. DC refers to a mode of operation in which a UE, in RRC_CONNECTED state, consumes radio resources provided by at least two different network points connected to one another with a non-ideal backhaul. In the LTE standards, these two network points may be referred to as a "Master eNB" (MeNB) and a "Secondary eNB" (SeNB). More generally, they can be referred to as a master node (MN) and a secondary node (SN). DC can be viewed as a special case of carrier aggregation (CA), where the aggregated carriers (or cells) are provided by network nodes that are physically separated and not connected via a robust, high-capacity connection.

More specifically, in DC, the UE is configured with a Master Cell Group (MCG) and a Secondary Cell Group (SCG). A Cell Group (CG) is a group of serving cells served by a single node and includes one MAC entity, a set of logical channels with associated RLC entities, a primary cell, and optionally one or more SCells. The MCG is associated with the MeNB and includes a PCell and optionally one or more SCells. The SCG is associated with the SeNB and includes a Primary SCell (PSCell) and optionally one or more SCells. The term "Special Cell" (or "SpCell" for short) refers to the PCell of the MCG or the PSCell of the SCG depending on whether the UE's MAC entity is associated with the MCG or the SCG, respectively. An SpCell is always activated and supports physical uplink control channel (PUCCH) transmission and contention-based random access (CBRA) by UEs.

The MeNB terminates the CP connection (e.g., RRC, S1-MME) towards the UE and, as such, is the controlling node of the UE, including handovers to and from SeNBs. The SeNB provides additional radio resources (e.g., bearers) for the UE. Types of radio resource bearers include MCG bearers, SCG bearers, and split bearers. SRBs are always configured as MCG bearer type and only use radio resources of the MeNB. However, the MeNB can also configure the UE based on input from the SeNB (e.g., via the X2 interface) and, in this manner, the SeNB can indirectly control the UE.

In LTE, UEs provide measurement reports—whether in response to an event trigger or a periodic trigger—that include measurements of serving cell(s). For a UE in LTE-DC, "serving cells" includes both cells in both MCG and SCG. For mobility measurement, the MeNB configures a UE according to various criteria including, e.g., frequency to measure, how to report, etc. Correspondingly, the UE sends measurement results to the MeNB once the measurement criteria are met.

In 3GPP, a study item on a new radio interface for 5G was completed and 3GPP has is now standardizing a new 5G radio interface, often abbreviated by NR (New Radio). While LTE was primarily designed for user-to-user communications, 5G/NR networks are envisioned to support both high single-user data rates (e.g., 1 Gb/s) and large-scale, machine-to-machine communication involving short, bursty transmissions from many different devices that share the frequency bandwidth.

3GPP standardization for NR Rel-15 includes a work item for CA and DC enhancements. For example, it has been agreed to introduce early measurement reporting by UEs based on the LTE Rel-15 solutions with some extensions. More specifically, a UE can be configured to perform early measurements on both LTE and NR carriers, as well as performing and reporting beam measurements. This is in addition to cell measurements and reporting supported by LTE Rel-15. However, these proposed measurement reporting techniques have various problems, issues, and/or drawbacks related to UE CA and/or DC operation in certain low-power states in which the SCG is suspended.

SUMMARY

Exemplary embodiments disclosed herein address these and other problems, issues, and/or drawbacks of existing solutions by providing flexible and efficient techniques for configuring, performing, and reporting UE SCG measurements while the UE's SCG is suspended. Such exemplary embodiments can improve network functionality and/or reliability as well as reducing UE energy consumption.

Embodiments include methods (e.g., procedures) for performing measurements on a secondary cell group (SCG) while the SCG is suspended. These exemplary methods can be performed by a user equipment (UE, e.g., wireless device, MTC device, NB-IoT device, modem, etc. or component thereof) in communication with a network node (e.g., base station, eNB, gNB, etc., or components thereof) in the wireless network (e.g., E-UTRAN, NG-RAN).

These exemplary methods can include receiving, from the network node, a message including an indication that the SCG should be suspended, and/or a first SCG measurement configuration to be used while the SCG is suspended. In various embodiments, the message can be received from one of the following: a master node (MN) providing the UE's master cell group (MCG); a secondary node (SN) providing the SCG; or the MN including content generated by the SN.

These exemplary methods can also include suspending the SCG in response to the message and performing measurements on the suspended SCG according to an SCG measurement configuration. The SCG measurement configuration can be the first SCG measurement configuration when the same was included in the message; or a second SCG measurement configuration applicable before the SCG was suspended, when the first SCG measurement configuration was not included in the message.

In some embodiments, these exemplary methods can also include, before receiving the message, performing and reporting measurements on the SCG according to the second SCG measurement configuration. For example, these measurements can be performed by the UE before the SCG was suspended.

In some embodiments, performing the measurements on the suspended SCG can be responsive to receiving the message including the indication that the SCG should be suspended. In other embodiments, performing the measurements on the suspended SCG can be responsive to the UE receiving, from the network node, a further message including an explicit request to initiate the measurements.

In some embodiments, these exemplary methods can also include detecting the occurrence of one or more reporting conditions while the SCG is suspended and, based on detecting the one or more reporting conditions, reporting the measurements performed on the suspended SCG according to the SCG measurement configuration. In some embodiments, the one or more reporting conditions can be included in the SCG measurement configuration (e.g., the first or second SCG measurement configuration).

In some of these embodiments, the detecting operations can include receiving, from the network node, a request for the measurements performed on the suspended SCG. The reporting operations can be responsive to that request.

In other of these embodiments, the detecting operations can include receiving, from the network node, a command to perform one of the following actions: activate the SCG, reconfigure the SCG, or release the SCG. The reporting operations can be responsive to that command. In some embodiments, the command can include an explicit request to report the measurements on the suspended SCG upon performing the action associated with the command.

In other of these embodiments, the detecting operations can include detecting at least one of the following:
  arrival of uplink (UL) data, at the UE, belonging to a bearer associated with the SCG;
  an amount of available UL data, at the UE, exceeds one or more thresholds;
  the measurements on the suspended SCG fulfill a first predetermined threshold or condition; and
  the measurements on the suspended SCG do not fulfill a second predetermined threshold or condition.

In such embodiments, the reporting operations can include transmitting, to the network node, a first request to resume the suspended SCG. In one variant of such embodiments, the measurements can be included with the first request.

In another variant of such embodiments, the reporting operations can also include receiving, from the network node (e.g., in response to the first request), a second request for the measurements performed on the suspended SCG; and reporting the measurements to the network node in response to the second request.

Other embodiments include methods (e.g., procedures) for configuring UE measurements on a secondary cell group (SCG) in a wireless network while the SCG is suspended. These exemplary methods can be performed by one or more network nodes (e.g., base stations, eNBs, gNBs, etc., or component thereof) in the wireless network (e.g., E-UTRAN, NG-RAN).

These exemplary methods can include transmitting, to the UE, a message including an indication that the UE's SCG should be suspended, and/or a first SCG measurement configuration to be used by the UE while the UE's SCG is suspended. In various embodiments, the message can be transmitted by one of the following: a master node (MN) providing the UE's master cell group (MCG); a secondary node (SN) providing the SCG; or the MN including content generated by the SN.

These exemplary methods can also include receiving, from the UE, measurements performed on the suspended SCG according to an SCG measurement configuration. The SCG measurement configuration can be the first SCG measurement configuration, when the first measurement configuration was included in the message; or a second SCG measurement configuration applicable before the UE's SCG was suspended, when the first SCG measurement configuration was not included in the message.

In some embodiments, these exemplary methods can also include receiving, from the UE before transmitting the message, one or more reports of measurements performed on the SCG according to the second SCG measurement configuration. For example, these measurements can be performed by the UE before the SCG was suspended.

In some embodiments, the network node can request the UE to perform measurements on the suspended SCG based on transmitting the message including the indication that the SCG should be suspended. In other embodiments, these exemplary methods can also include transmitting, to the UE, a further message including an explicit request to perform the measurements on the suspended SCG.

In some embodiments, these exemplary methods can also include transmitting, to the UE, a request for measurements performed on the suspended SCG. The measurements performed on the suspended SCG can be received from the UE in response to the request.

In other embodiments, these exemplary methods can also include transmitting, to the UE while the SCG is suspended, a command to perform one of the following actions: activate the SCG, reconfigure the SCG, or release the SCG. The measurements performed on the suspended SCG can be received from the UE in response to the command. In some embodiments, the command can include an explicit request to report the measurements on the suspended SCG upon performing the action associated with the command.

In other embodiments, the measurements performed on the suspended SCG can be received in response to the UE detecting at least one of the following:
  arrival of uplink (UL) data, at the UE, belonging to a bearer associated with the SCG;
  an amount of available UL data, at the UE, exceeds one or more thresholds;
  the measurements on the suspended SCG fulfill a first predetermined threshold or condition; and
  the measurements on the suspended SCG do not fulfill a second predetermined threshold or condition.

In such embodiments, the receiving operations can include receiving, from the UE, a first request to resume the suspended SCG. In one variant of such embodiments, the measurements can be included with the first request.

In another variant of such embodiments, the receiving operations can also include transmitting, to the UE (e.g., in response to the first request), a second request for the measurements performed on the suspended SCG; and receiving the measurements from the UE in response to the second request.

Other embodiments include UEs (e.g., wireless devices, MTC devices, NB-IoT devices, modems, etc. or components thereof) and network nodes (e.g., base stations, eNBs, gNBs, ng-eNBs, etc., or components thereof) configured to perform operations corresponding to any of the exemplary methods described herein. Other embodiments include non-transitory, computer-readable media storing program instructions that, when executed by processing circuitry, configure such UEs or network nodes to perform operations corresponding to any of the exemplary methods described herein.

These and other objects, features, and advantages of the present disclosure will become apparent upon reading the following Detailed Description in view of the Drawings briefly described below.

BRIEF DESCRIPTION OF THE DRAWINGS

FIG. 3 is a high-level network diagram illustrating various exemplary LTE dual connectivity (DC) scenarios involving user equipment (UEs) and base stations (eNBs).

FIGS. 4A and 4B show exemplary ASN.1 data structures defining messages or information elements (IEs) by which a UE can be configured to perform idle-mode measurements.

FIG. 5, which includes FIGS. 5A-5D, shows signaling flows and ASN.1 data structures of messages used for requesting and reporting UE idle-mode measurements.

FIG. 8 illustrates various options for deploying LTE and 5G networks with or without interworking between such networks.

FIG. 9 shows NR radio resource control (RRC) states and procedures by which a UE transitions between NR RRC states.

FIGS. 10-11 show ASN.1 data structures for an exemplary RRCReconfiguration message that can be used for configuring UE measurements of a suspended secondary cell group (SCG), according to various exemplary embodiments of the present disclosure.

FIG. 12 shows an ASN.1 data structure for an exemplary UEAssistanceInformation message that includes a request to resume a suspended SCG and an SCG measurement report, according to various exemplary embodiments of the present disclosure.

FIGS. 13A and 13B, respectively, show ASN.1 data structures defining exemplary RRCReconfiguration and RRCReconfigurationComplete messages, according to various exemplary embodiments of the present disclosure.

FIGS. 22-25 are flow diagrams illustrating various exemplary methods (e.g., procedures) implemented in a communication system, according to various exemplary embodiments of the present disclosure.

DETAILED DESCRIPTION

Figure 1:
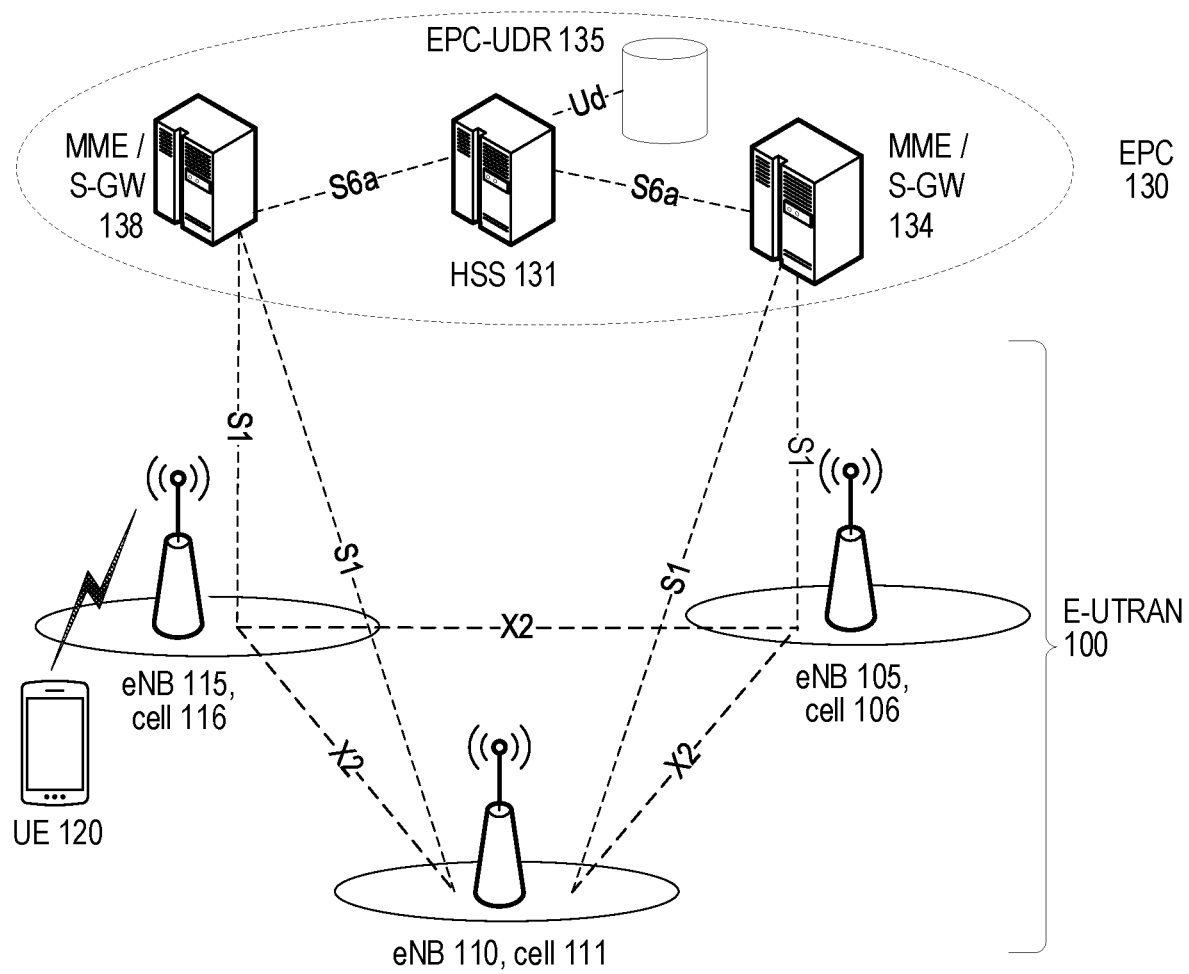
FIG. 1 is a high-level illustration of an exemplary architecture of the Long-Term Evolution (LTE) Evolved UTRAN (E-UTRAN) and Evolved Packet Core (EPC) network, as standardized by 3GPP.
Figure 2:
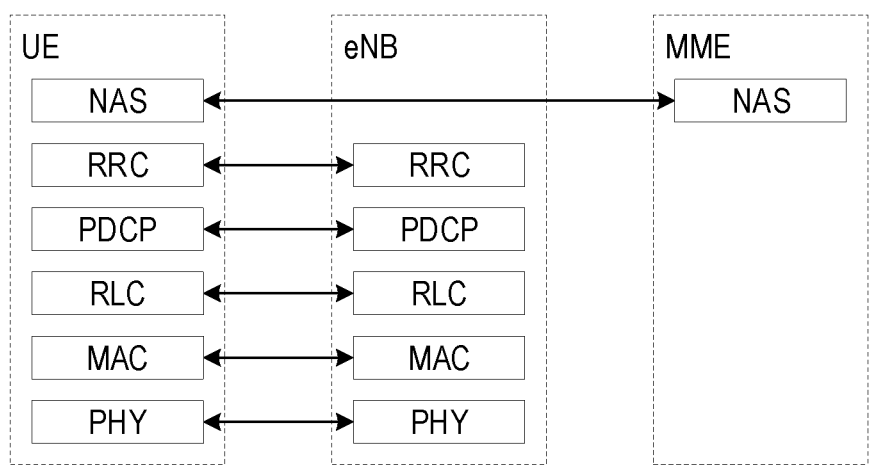
FIG. 2 is a high-level illustration of exemplary protocol layers of the control-plane portion of the radio interface between a user equipment (UE) and the E-UTRAN.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiment, and vice versa. Other objectives, features and advantages of the enclosed embodiments will be apparent from the following description.

Furthermore, the following terms are used throughout the description given below:
  Radio Node: As used herein, a "radio node" can be either a "radio access node" or a "wireless device."
  Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.
  Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices.

Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description given herein focuses on a 3GPP cellular communications system and, as such, 3GPP terminology or terminology similar to 3GPP terminology is oftentimes used. However, the concepts disclosed herein are not limited to a 3GPP system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from the concepts, principles, and/or embodiments described herein.

In addition, functions and/or operations described herein as being performed by a wireless device or a network node may be distributed over a plurality of wireless devices and/or network nodes. Furthermore, although the term "cell" is used herein, it should be understood that (particularly with respect to 5G NR) beams may be used instead of cells and, as such, concepts described herein apply equally to both cells and beams.

As mentioned above, 3GPP standardization for NR Rel-15 includes a work item for carrier aggregation (CA) and dual connectivity (DC) enhancements. For example, it has been agreed to introduce early measurement reporting by UEs based on the LTE Rel-15 solutions with some extensions. More specifically, a UE can be configured to perform early measurements on both LTE and NR carriers, as well as performing and reporting beam measurements. This is in addition to cell measurements and reporting supported by LTE Rel-15. However, these proposed measurement reporting techniques have various problems, issues, and/or drawbacks related to UE CA and/or DC operation in certain low-power states in which the SCG is suspended. This is discussed in more detail below.

FIG. 3 illustrates various exemplary LTE DC scenarios involving UEs 300 (e.g., 300a-d) and base stations (eNBs) 310 (e.g., 310a-e). As shown, only one SeNB (at most) is connected to any of the illustrated UEs. However, more than one SeNB can serve a UE in general. Moreover, only one cell each from both MeNB and SeNB are shown to be serving the UE, however more than one cells can serve the UE in practice from both MeNB and SeNB. FIG. 3 also illustrates that DC is a UE-specific feature and that a given network node (or a serving cell) can support a dual-connected UE and a legacy UE at the same time. In other words, MeNB and SeNB are roles played, or functions provided, by eNBs 310 in a particular situation, e.g., with respect to a particular UE. Thus, while the eNBs 310 in FIG. 3 are labeled "MeNB" and "SeNB," this indicates only that they are playing this role for at least one UE 300. Indeed, a given eNB 310 may be an MeNB for one UE while being an SeNB for another UE.

In other words, the master/anchor and secondary/booster roles are defined from a UE's point of view, which means that a node (or cell) that acts as an anchor to one UE may act as booster to another UE. Likewise, although a given UE in a DC scenario reads system information from the anchor node (or cell), a node (or cell) acting as a booster to one UE may or may not distribute system information to another UE. Furthermore, in LTE, only inter-frequency DC is supported (i.e., the MCG and SCG must use different carrier frequencies).

In summary, DC allows an LTE-capable UE to be connected to two nodes—MeNB and SeNB—and to receive data from both nodes, thereby increasing its data rate. The MeNB (or MN) provides system information, terminates the CP, and can terminate the UP. An SeNB (or SN), on the other hand, terminates only the UP. This UP aggregation achieves benefits such as increasing the per user throughput for users that have good channel conditions and the capability of receiving and transmitting at higher data rates than can be supported by a single node, even without a low-latency backhaul/network connection between the MeNB and SeNB.

To support mobility (e.g., handover or reselection) between cells and/or beams, a UE can perform periodic cell search and measurements of signal power (e.g., reference signal received power, RSRP), signal quality (e.g., reference signal received quality, RSRQ), and/or signal-to-interference-plus-noise ratio (SINR) in both RRC_CONNECTED and RRC_IDLE modes. The UE is responsible for detecting new neighbor cells and for tracking and monitoring previously detected cells. An LTE UE can perform such measurements on various downlink reference signals (RS) including, e.g., cell-specific Reference Signal (CRS), MBSFN reference signals, UE-specific Demodulation Reference Signals (DM-RS) associated with PDSCH, Demodulation Reference Signal (DM-RS) associated with EPDCCH or MPDCCH, Positioning Reference Signal (PRS), and/or CSI Reference Signal (CSI-RS).

Detected cells and measurement values associated with monitored and/or detected cells are reported to the network. Reports to the network can be configured to be periodic or aperiodic based a particular event. Such reports are commonly referred to as mobility measurement reports and contain channel state information (CSI). These reports can be used, e.g., to make decisions on UE mobility and/or dynamic activation or deactivation of SCells in a UE's carrier aggregation (CA) configuration.

UE measurement reports to the network can be configured to be periodic or aperiodic (e.g., based a particular event). For example, the network can configure a UE to perform measurements on various carrier frequencies and various radio access technologies (RATs) corresponding to neighbor cells, as well as for various purposes including, e.g., mobility and positioning. The configuration for each of these measurements is referred to as a "measurement object." Furthermore, the UE can be configured to perform the measurements according to a "measurement gap pattern" (or "gap pattern" for short), which can comprise a measurement gap repetition period (MGRP) (i.e., how often a regular gap available for measurements occurs) and a measurement gap length (MGL) (i.e., the length of each recurring gap).

In LTE Rel-13, a mechanism was introduced for the UE to be suspended by the network in a suspended state similar to RRC_IDLE but with some differences. First, the suspended state is not a third RRC "state" alongside RRC_IDLE and RRC_CONNECTED; rather it can be viewed as a "substate" of RRC_IDLE. Second, both the UE and the serving eNB store the UE's AS (e.g., S1-AP) context and RRC context after suspension. Later when the suspended UE needs to resume a connection (e.g., to send UL data), instead of going through the conventional service request procedure, the suspended UE merely sends an RRCConnectionResume-Request message to the eNB. The eNB resumes the SI AP context and responds with a RRCConnectionResume message. There is no elaborate exchange of security context between MME and eNB and no setup of access stratum (AS) security context. The preserved AS and RRC contexts are merely resumed from where they were suspended earlier. Reducing the signaling can provide reduced UE latency (e.g. for smart phones accessing Internet) and reduced UE signaling, which can lead to reduced UE energy consumption, particularly for machine type communication (MTC) devices that send very little data (i.e., signaling being a primary consumer of energy).

LTE Rel-15 added the possibility to configure the UE to report "early measurements" upon the transition from RRC_IDLE to RRC_CONNECTED. Such measurements can be performed by the UE while in RRC_IDLE, according to a configuration provided by the source cell, and sent to the network immediately after the UE returns to RRC_CONNECTED. This can facilitate quick setup of CA and/or DC without the need to first provide a measurement configuration in RRC_CONNECTED, after which the UE may take considerable time to start collecting and monitoring samples, triggering a measurement report, and sending such a report to the network.

One aspect of this early measurement solution for LTE is described in 3GPP TS 36.331 section 5.6.19 ("Idle Mode Measurements"). The UE can receive these idle mode measurement configurations in the system information (e.g., SIB5) in the field MeasIdleConfigSIB-r15. The configurations can indicate up to eight (8) cells or ranges of cell IDs for which measurements are requested. In addition, the UE can be either configured upon the transition from RRC_CONNECTED to RRC_IDLE with a dedicated measurement configuration in the RRCConnectionRelease message (e.g., in measIdleDedicated-r15), which overrides the configurations broadcast in SIB5. FIGS. 4A and 4B show exemplary ASN.1 data structures defining an RRCConnectionRelease message with measIdleDedicated-r15 information element (IE) and a MeasIdleConfigSIB-r15 IE for SIB5, respectively. Note that both include a MeasIdleConfigDedicated-r15 IE, which is defined in FIG. 4B. Table 1 below further defines certain fields shown in FIG. 4B, some of which are explained in more detail in the following.

TABLE 1

| Field name | Description |
| --- | --- |
| allowedMeasBandwidth | If absent, the value corresponding to the downlink bandwidth indicated by the dl-Bandwidth included in MasterInformationBlock of serving cell applies. |
| carrierFreq | E-UTRA carrier frequency to be used for measurements during IDLE mode. |
| measIdleCarrierListEUTRA | E-UTRA carriers to be measured during IDLE mode. |
| measIdleDuration | Duration for performing measurements during IDLE mode for measurements assigned via RRCConnectionRelease. Value sec10 correspond to 10 seconds, value sec30 to 30 seconds and so on. |
| qualityThreshold | Quality thresholds for reporting the measured cells for IDLE mode measurements. |
| reportQuantities | Which measurement quantities UE is requested to report in the IDLE mode measurement report. |
| measCellList | List of cells which the UE is requested to measure and report for IDLE mode measurements. |
| validityArea | List of cells within which UE is requested to do IDLE mode measurements. If the UE reselects to a cell outside this list, the measurements are no longer required. |

Upon the reception of such a measurement configuration, the UE starts a timer T331 with the value provided in measIdleDuration, which can range from 0 to 300 seconds. The timer stops upon receiving RRCConnectionSetup or RRCConnectionResume indicating a transition to RRC_CONNECTED. This effectively limits the duration of time that the UE performs early measurements. In addition, the validityArea includes a list of physical cell identities (PCIs), which corresponds to a limited area in which CA and/or DC may be setup when the UE resumes or sets up the connection. This effectively limits that area in which the UE performs early measurements.

If validityArea is configured, and UE reselects to a serving cell whose PCI does not match any entry in validityArea for the corresponding carrier frequency, timer T331 is stopped and the UE stops performing RRC_IDLE measurements and releases the configuration (e.g., stored in VarMeasIdleConfig). However, this does not require the UE to release and/or delete measurements that were already performed; these may still be stored and possibly requested by the network. In addition, the UE may continue with RRC_IDLE measurements according to the broadcasted SIB5 configuration after the timer T331 has expired or stopped. In addition, only measurements above a certain threshold should be stored, since cell candidates for CA setup must be within a minimum acceptable threshold.

3GPP TS 36.331 (v15.7.0) section 5.6.19 (including subsections) specifies a procedure for UE idle mode measurements, which is incorporated herein by reference. In general, however, UE measurements performed in RRC_IDLE are left up to UE implementation as long as requirements for measurement reporting defined in 3GPP TS 36.133 are met.

When the UE tries to resume or setup a connection from RRC_IDLE without AS context, if the UE was previously configured to store idle-mode measurements (e.g., in the manner discussed above), the network may ask the UE after resume/setup is complete whether the UE has idle measurements available. Since the UE is setting up or resuming the connection without the AS context, the network is not aware that the UE has available measurements stored. Accordingly, the UE may indicate the availability of stored idle measurements in RRCConnectionSetupComplete. Since not all cells would support the feature anyway, the UE includes measurement availability only if the UE's current serving cell broadcasts the idleModeMeasurements indication. FIG. 5A shows an ASN.1 data structure defining an exemplary RRC-ConnectionSetupComplete message including the idleMeasAvailable indication. The logic described above is further explained in 3GPP TS 36.331 (v15.7.0) section 5.3.3.4, which is incorporated herein by reference.

When the UE tries to resume or setup a connection from RRC_IDLE with AS context, if the UE was previously configured to store idle-mode measurements (e.g., in the manner discussed above), the network may be aware that the UE may have available idle measurements stored after checking the UE context from the source node where the UE was suspended. However, it is still not certain that the UE has measurements available since the UE is only required to perform the measurements if the cells are above the configured RSRP/RSRQ thresholds and only within the configured validityArea. Accordingly, the UE may indicate the availability of stored idle measurements in RRCConnectionResumeComplete. Since not all cells would support the feature anyway, the UE includes measurement availability only if the UE's current serving cell broadcasts the idleModeMeasurements indication. FIG. 5B shows an ASN.1 data structure defining an exemplary RRCConnectionResumeComplete message including the idleMeasAvailable indication. The logic described above is further explained in 3GPP TS 36.331 (v15.7.0) section 5.3.3.4a, which is incorporated herein by reference.

Once the UE indicates to the target cell upon resume or setup that idle measurements are available, the network may finally request the UE to report these available measurements by including the field idleModeMeasurementReq in the UEInformationRequest message transmitted to the UE. Then, the UE responds with a UEInformationResponse containing the requested measurements. FIG. 5C shows a signal flow diagram illustrating such a UE information request/response procedure, while FIG. 5D shows an ASN.1 data structure defining an exemplary UEInformationResponse message containing the idle-mode measurements. As mentioned above, the reporting procedure is further specified in 3GPP TS 36.331 (v15.7.0) section 5.6.19 and subsections thereof.

While LTE was primarily designed for user-to-user communications, 5G (also referred to as "NR") cellular networks are envisioned to support both high single-user data rates (e.g., 1 Gb/s) and large-scale, machine-to-machine (M2M) communication involving short, bursty transmissions from many different devices that share the frequency bandwidth. The 5G radio interface (also referred to as "New Radio" or "NR") targets a wide range of data services including eMBB (enhanced Mobile Broad Band) and URLLC (Ultra-Reliable Low Latency Communication). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols. More specifically, an NR slot can include 14 symbols with normal cyclic prefix or 12 symbols for extended cyclic prefix.

Figure 6:
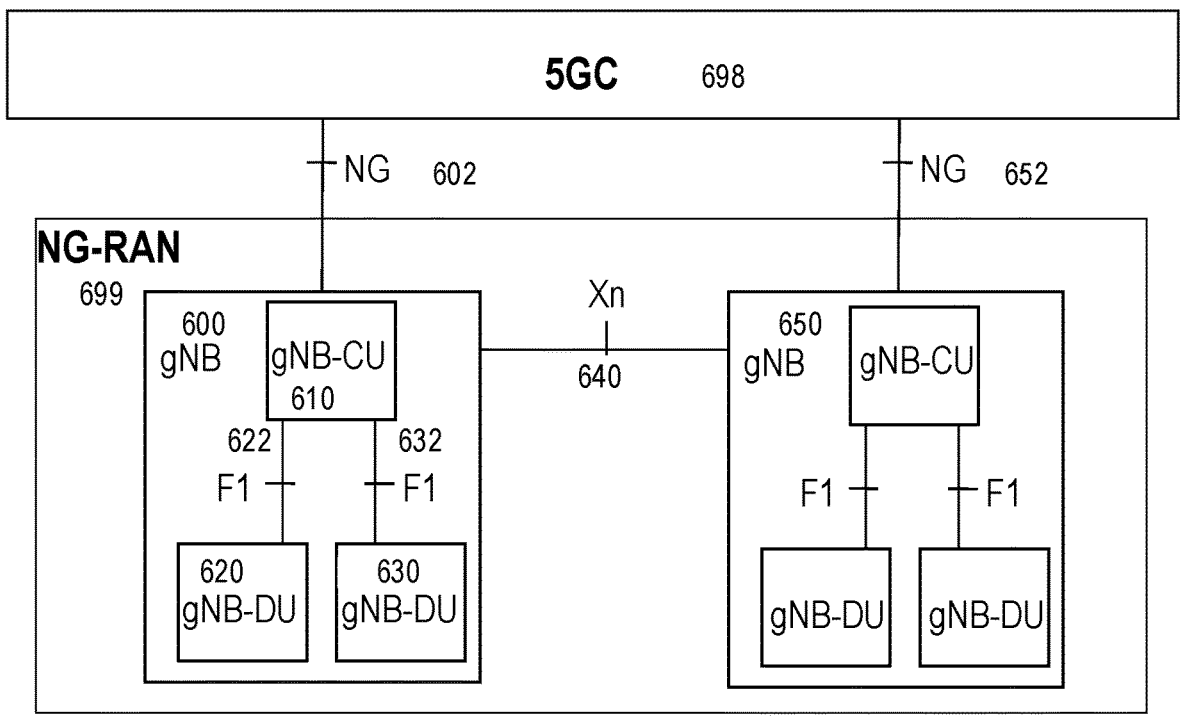
FIGS. 6-7 illustrate two different high-level view of an exemplary 5G network architecture.

FIG. 6 illustrates a high-level view of the 5G network architecture, consisting of a Next Generation RAN (NG-RAN 699) and a 5G Core (5GC 698). NG-RAN 699 can include a set of gNodeB's (gNBs) connected to the 5GC via one or more NG interfaces, whereas the gNBs can be connected to each other via one or more Xn interfaces, such as Xn interface 640 between gNBs 600 and 650 in FIG. 6. With respect to the NR interface to UEs, each of the gNBs can support frequency division duplexing (FDD), time division duplexing (TDD), or a combination thereof.

NG-RAN 699 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501. If security protection for control plane (CP) and user plane (UP) data on TNL of NG-RAN interfaces is supported, NDS/IP (6GPP TS 33.401) shall be applied.

The NG RAN logical nodes shown in FIG. 6 include a central (or centralized) unit (CU or gNB-CU) and one or more distributed (or decentralized) units (DU or gNB-DU). For example, gNB 600 in FIG. 6 includes gNB-CU 610 and gNB-DUs 620 and 630. CUs (e.g., gNB-CU 610) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to its associated gNB-DUs over respective F1 logical interfaces, such as interfaces 622 and 632 shown in FIG. 6. The gNB-CU and connected gNB-DUs are only visible to other gNBs and 5GC 698 as a gNB, e.g., the F1 interface is not visible beyond gNB-CU. In the gNB split CU-DU architecture illustrated by FIG. 6, DC can be achieved by allowing a UE to connect to multiple DUs served by the same CU or by allowing a UE to connect to multiple DUs served by different CUs.

Figure 7:
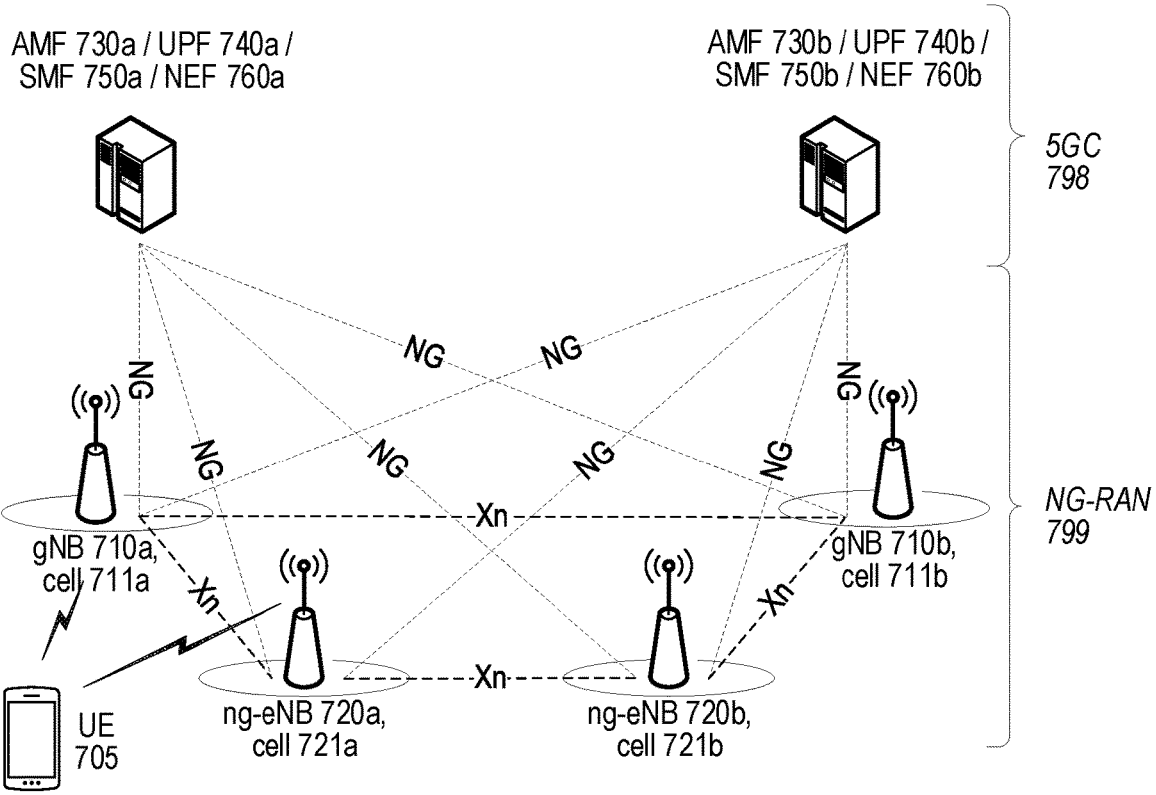

FIG. 7 shows another high-level view of an exemplary 5G network architecture. More specifically, FIG. 7 shows an NG-RAN 799 and a 5GC 798. NG-RAN 799 can include gNBs 710 (e.g., 710a,b) and ng-eNBs 720 (e.g., 720a,b) that are interconnected with each other via respective Xn interfaces. The gNBs and ng-eNBs are also connected via the NG interfaces to 5GC 798, more specifically to the AMF (Access and Mobility Management Function) 730 (e.g., AMFs 730a,b) via respective NG-C interfaces and to the UPF (User Plane Function) 740 (e.g., UPFs 740a,b) via respective NG-U interfaces. Moreover, the AMFs 730a,b can communicate with one or more session management functions (SMFs, e.g., SMFs 750a,b) and network exposure functions (NEFs, e.g., NEFs 760a,b).

Each of the gNBs 710 can be similar to those shown in FIG. 6, while each of the ng-eNBs can be similar to the eNBs shown in FIG. 1 except that they connect to 5GC 798 via an NG interface rather than to EPC via an S1 interface. Each of the gNBs and ng-eNBs can serve a geographic coverage area including one more cells, including cells 711a-b and 721a-b shown as exemplary in FIG. 7. The gNBs and ng-eNBs can also use various directional beams to provide coverage in the respective cells. Depending on the particular cell in which it is located, a UE 705 can communicate with the gNB or ng-eNB serving that particular cell via the NR or LTE radio interface, respectively. In addition, UE 705 can be in DC with a first cell served by an ng-eNB and a second cell served by a gNB, such as cells 721a and 711a shown in FIG. 7.

Like LTE, NR supports carrier aggregation (CA, allowing a UE to utilize multiple carriers (e.g., CC1, etc.) or serving cells (e.g. PCell, SCells), as they are sometimes referred to. This increases the available bandwidth for the UE and, hence, the potential throughput. Perhaps even more critical in some cases, CA allows the UE to use scattered bandwidths. An operator may have access to several bandwidths, potentially in different frequency bands. With CA, these bandwidths separated in frequency can be aggregated for one UE.

A UE may be configured with a subset of the cells offered by the network, and the number of aggregated cells (i.e., SCells) configured for one UE can change dynamically through time based on, e.g., terminal traffic demand, type of service used by the terminal, system load, etc. PCells and SCells can be configured (or de-configured) using RRC signaling, which can be slow. Although the UE's PCell is always activated, SCells can be activated (or deactivated) using a Medium Access Control (MAC) control element (CE), which is much faster. Since the activation/deactivation process is based on the faster MAC CE signaling, the number of activated SCells can be quickly adjusted to match the data rate the UE needs at any given time. In other words, the above-described SCell activation scheme provides the ability to keep multiple SCells configured but only activate them individually as needed.

In addition to the activated and deactivated SCell states, a "dormant" state was introduced for SCells in LTE Rel-15 and NR Rel-15. The dormant state may be considered as in between activated and deactivated states. More specifically, a UE performs channel quality measurements and reports CSI for dormant SCells, but neither monitors DL channels (e.g., PDSCH, PDCCH) nor performs any UL transmissions (e.g., PUCCH, PUSCH, SRS) using dormant SCells. This limited downlink monitoring can reduce UE energy consumption compared to cells in the activated state. However, the UE will not be able to receive and/or transmit data on dormant cells without activating such cells. Such transitions can be faster than moving a cell from deactivated state to activated state, hence the latency and/or delay experienced by user data can be shorter starting in the dormant state rather than in the deactivated state.

Similar to transitions between active and deactivated state, MAC CEs are used for the network to indicate to the UE to move SCells to/from the dormant state. Moving a cell to dormant is also referred to in 3GPP specifications "hibernating." Table 1 below shows how values of the two SCell MAC CEs determine the corresponding SCell state. Alternatively, an activated SCell can be configured with a deactivation timer or a hibernation timer, whereby if the timer expires, the SCell enters the deactivated or dormant state, respectively.

TABLE 1

| Hibernation MAC control element $C_i$ | Activation/ Deactivation MAC control element $C_i$ | SCell shall be |
|---|---|---|
| 0 | 0 | Deactivated |
| 0 | 1 | Activated |
| 1 | 0 | Reserved MAC control element combination |
| 1 | 1 | Dormant |

For NR Rel-15, one difference from LTE is that SCell dormancy will be based on bandwidth parts (BWPs), such that UEs can receive downlink control indication (DCI, e.g., via PDCCH) that switches an SCell from an active BWP to a dormant BWP. Even so, the details of such operations have not been specified.

3GPP TR 38.804 describes various exemplary dual-connectivity (DC) scenarios or configurations in which the MN and SN can apply either NR, LTE or both. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR;

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR.

MR-DC (multi-RAT DC): a generalization of the Intra-E-UTRA Dual Connectivity (DC) described in TS 36.300, where a multiple Rx/Tx UE may be configured to utilize resources provided by two different nodes connected via non-ideal backhaul, one providing E-UTRA access and the other one providing NR access. One node acts as the MN and the other as the SN. The MN and SN are connected via a network interface and at least the MN is connected to the core network. EN-DC, NE-DC, and NGEN-DC are different example cases of MR-DC.

Since deployment and/or migration for these options may differ for different operators, it is possible to have deployments with multiple options in parallel in the same network. In combination with LTE/NR DC solutions, it is also possible to support CA in each cell group (i.e., MCG and SCG) and DC between nodes on same RAT (e.g., NR-NR DC). For the NR cells, a consequence of these different deployments is the co-existence of NR cells supporting standalone (SA) only, non-standalone (NSA) only, or both SA and NSA. For the LTE cells, a consequence of these different deployments is the co-existence of LTE cells associated to eNBs connected to EPC, 5GC or both EPC and 5GC.

FIG. 8 illustrates various options for deploying a 5G network with or without interworking with existing LTE and EPC, according to current 3GPP standards. Option 1 depicts the legacy LTE standalone (SA) deployment where LTE eNBs are connected to an EPC. Option 2 depicts NR SA deployment where the NR gNBs are connected to a 5GC. Option 3/3A/3X depicts EN-DC, described above. Option 4/4A depicts NE-DC, described above. Option 5 depicts a hybrid solution similar to FIG. 7, in which enhanced LTE eNBs (i.e., ng-eNBs) are connected to a 5GC. Finally, option 7/7A depicts NGEN-DC, described above.

In NR Rel-15, a new RRC_INACTIVE state was added with similar properties as the suspended condition in LTE Rel-13. Nevertheless, RRC_INACTIVE has slightly different properties in that it is a separate RRC state and not part of RRC_IDLE as in LTE. Additionally, the CN/RAN connection (NG or N2 interface) is kept alive during RRC_INACTIVE while it was suspended in LTE. As such, while in RRC_INACTIVE, a UE also monitors a paging channel for both CN- and RAN-based paging and performs RAN-based notification area updates periodically and when moving outside a RAN-based notification area. Also, an RRC_INACTIVE UE's context is maintained in both RAN and UE, whereas it is released in both for RRC_IDLE UEs.

FIG. 9 shows NR RRC states and procedures by which a UE transitions between the NR RRC states. As shown in FIG. 9, the transitions between RRC_INACTIVE and RRC_CONNECTED states are realized by two new procedures: "Suspend" (also called RRC connection release with SuspendConfig) and "Resume." A gNB can suspend a connection and move a UE from RRC_CONNECTED to RRC_INACTIVE by sending the UE an RRCRelease message with suspend indication (or configuration). This can happen, for example, after the UE has been inactive for a certain period, causing a gNB-internal inactivity timer to expire. Upon moving RRC_INACTIVE, both the UE and gNB store the UE's access stratum (AS) context and the associated identifier (referred to as I-RNTI).

In addition, NR SCell configurations are stored upon UE suspension to RRC_INACTIVE and only deleted when the UE is released to RRC_IDLE. 3GPP specifications define that the UE should store its AS context upon going to INACTIVE state, with the SCell configurations being part of the AS context. When an RRC_INACTIVE UE initiates a resume procedure, the SCell configurations are restored upon the reception of an RRCResume message from the network, which may contain SCell configurations to either add or remove SCells.

As mentioned above, 3GPP standardization for NR Rel-15 includes a work item for carrier aggregation (CA) and dual connectivity (DC) enhancements. For example, a UE can be configured to perform early measurements on both LTE and NR carriers, as well as performing and reporting beam measurements. This is in addition to cell measurements and reporting supported by LTE Rel-15. In addition, upon resumption from RRC_INACTIVE, the network can request an early measurement report already in a RRCResume or RRCConnectionResume message and the UE can include the early measurement report in the responsive RRCResumeComplete or RRCConnectionResumeComplete message. This information allows the network to configure the UE with CA/DC directly instead of waiting for UE measurement results after the UE has entered RRC_CONNECTED state.

In addition, it has been agreed within 3GPP that support for suspended secondary cell group (SCG) is within the scope of this work item. More specifically, this includes the following:

The UE supports network-controlled suspension of the SCG in RRC_CONNECTED.
UE behaviour for a suspended SCG is for further study (FFS).
The UE supports at most one SCG configuration, suspended or not suspended, in Rel-15.
In RRC_CONNECTED state upon addition of the SCG, the SCG can be either suspended or not suspended by configuration.

One alternative is to model a suspended SCG based on dormant SCells as defined in LTE Rel-15. In this arrangement, the UE stops monitoring the PDCCH (physical downlink control channel) of the dormant SCell but would continue to perform CSI measurements and radio resource management (RRM) measurements. This reduces UE energy consumption since the monitoring of the PDCCH at higher frequencies can consume considerable energy.

Another alternative is to model the suspended SCG based on a deactivated SCell. In this arrangement, the UE stops all UL transmissions and DL reception on the SCell/carrier. As the UE can be configured by either MN or SN with measurement configurations for the PSCell in the active SCG, it is still unclear whether the UE should stop SCell measurements.

Considering these alternatives, if the UE continues performing MN- or SN-configured measurements for the PSCell while the SCG is suspended, the UE would have to keep monitoring the PSCell and report the measurement results periodically or based on some event (e.g., when PSCell becomes better/worse than a threshold or a neighbor cell). Since the SCG is suspended and carries no data traffic for the UE, these measurements are primarily relevant for deciding when the suspended SCG should be released (e.g., due to PSCell quality becoming very bad), or for ensuring that the SCG is good enough to be activated if needed (e.g., based on UE traffic needs).

On the other hand, if the measurements of the PSCell are stopped when the SCG is suspended, the network will not know the quality of the PSCell when it decides to activate the SCG (e.g., due to UE traffic needs). As such, the network must either activate the SCG blindly or instruct the UE to perform new measurements before activation, thereby adding an undesirable delay to the activation process.

Embodiments of the present disclosure address these and other problems, issues, and/or shortcomings of prior solutions by a novel technique to enable the configuration of measurements related to a suspended SCG, whereby the measurements are performed while the SCG is suspended and reported when the SCG is activated or to be activated. The measurement configuration can be sent to a UE from the MN, SN, or a combination (e.g., MN message that embeds an SN message). Likewise, the configured measurements can be sent to MN and/or SN.

In this manner, the UE can be configured to perform measurements of a suspended SCG for a limited time and only report the measurement results once the SCG need to be re-activated. Relative to continuous SCG measurement reporting, such embodiments can reduce UE energy consumption (e.g., due to fewer measurements) and signaling with the network (e.g., since only one report is transmitted). On the other hand, relative to stopping SCG-related measurements when the SCG is suspended, such embodiments can enable faster re-activation of the SCG when needed (e.g., when data arrives for an SCG-terminated bearer) due to the network having up-to-date SCG measurements. Otherwise, the SCG activation would have to be done blindly and could result in degraded performance or even SCG failure if the radio conditions in the PSCell are not good at that time. In such case, with up-to-date SCG measurements, the network can decide to activate the suspended SCG or reconfigure/change the SCG configurations as needed.

At a high level, various embodiments can include a method performed by a UE connected to a first cell in a MCG provided by a first network node (e.g., MN) and associated with a second cell in an SCG provided by a second network node (e.g., SN). For example, the UE can be connected to the SCG, or it could have been previously connected to a currently suspended SCG. In some embodiments, a UE can receive an RRC message from a network node that includes an indication that the SCG should be suspended, and/or a measurement configuration to be used while the SCG is suspended. The RRC message can be received from the first network node or the second network node. In some embodiments, RRC message can be received from the first network node, but it has some of its contents are generated by the second network node and embedded in the RRC message received from the first network node.

In some embodiments, the measurement configuration to be used while the SCG is suspended could be a measurement configuration to be used only while the SCG is suspended; and/or a measurement configuration that was configured while the SCG was active, but which is to be continued even after the SCG is suspended.

In the measurement configuration can include a measurement reporting configuration that is triggered differently than periodic or event-based triggering. For example, there can be an on-demand reporting configuration, whereby UE performs measurements and only reports them if/when explicitly asked by the network. As other examples, the measurement reporting configuration can include any of the following reporting conditions:

report when SCG activation command is received;
report when UL data belonging to an SCG terminated bearer has to be sent; and
report when certain buffer status conditions are met (e.g. total buffer size of a UL data becomes greater than a certain threshold, total buffer size of UL data belonging to split bearers becomes greater than a certain threshold, buffer size of UL data of a certain (split) bearer becomes greater than a certain threshold, etc.).

In some embodiments, the UE can suspend the SCG and start (or continue) performing measurements according to the received measurement configuration. For example, the reception of the request to suspend the SCG can be an implicit indication to start performing the measurements. Alternately, the indication to start performing the measurements can be explicit, e.g., a separate RRC message than the one that suspended the SCG, a separate MAC CE received at the MN MAC, etc.

In some embodiments, the UE can also receive an indication from the first network node (e.g., MN) to report the measurements related to the SCG. In some embodiments, the UE can transmit the measurement results for the suspended SCG to the first network node. This can be in response to the received indication, or in response to some other event.

In some embodiments, the UE can also receive an indication from the first network node to perform one or more of the following: activate the SCG; reconfigure the SCG; and release the SCG. In some embodiments, the UE can also transmit an indication, to the network, that the first network node should request the UE to activate the SCG. This can be in response to arrival of UL data at the UE, such that it would be desirable to transmit the UL data using the SCG. The indication, by the network, for the UE to activate the SCG can be sent in response to the UE's transmission of the indication to request activation.

In some embodiments, the indication to report the performed SCG measurements and the indication to activate/reconfigure/release the SCG may be received/transmitted in the same RRC message. In some embodiments, the indication that the first network node should request the UE to activate the SCG can be received/transmitted in the same RRC message as the performed SCG measurement results.

In some embodiments, the UE can also activate the SCG, which can include connecting to and/or performing a random access to the PSCell. In some embodiments, the UE can activate the SCG in response to a request to activate received from the first network node.

In other embodiments, the UE can be configured with a conditional activation configuration including SCG activation conditions. The UE subsequently checks whether the activation conditions are fulfilled (e.g. PSCell RSRP> threshold) and activates the SCG only when the conditions are fulfilled. The UE can indicate to the network when it has activated the SCG upon fulfillment of the conditions. Optionally, the UE can send SCG measurement reports only when the activation conditions are not fulfilled, so that the network could use the measurements to reconfigure the SCG. Alternately, the UE can send SCG measurement reports even when the activation conditions are fulfilled, to enable the network to add/remove SCG SCells based on the measurement results.

The embodiments summarized above can be further illustrated by the following description, including various examples. In the following, a UE is configured with DC including an MCG and an SCG. If the traffic on the SCG stops while the traffic on the MCG continues, the UE could benefit from suspending the transmission, reception, and monitoring of the SCG while still maintaining the connection to the MCG. For example, this could occur when some services requiring high bandwidth (e.g. file downloading, video streaming, etc.) served by the SCG end, while other services requiring less bandwidth but higher reliability (e.g. voice call) served by the MCG continue. In NR Rel-15, it has been agreed that the network can suspend the SCG, but it is not clear whether the UE continues to measure the suspended SCG.

In some embodiments, when the UE receives the indication to suspend the SCG, it also receives a new SCG measurement configuration. FIG. 10 shows an ASN.1 data structure defining an exemplary RRCReconfiguration message including an indication to suspend the SCG (i.e., suspendSCG in RRCReconfiguration-v05xx-IEs) and an SCG measurement configuration to use while the SCG is suspended (i.e., suspendedSCG-measConfig). Note that the latter also references MeasIdleConfigDedicated-r15 IE, which can be defined by the exemplary ASN.1 data structure shown in FIG. 11.

In addition, the UE's operation according to these embodiments can be further defined by the following procedural text, which can be included in 3GPP TS 38.331 or another 3GPP specification.

*Begin Proposed Specification Text*

5.3.5.3 Reception of an RRCReconfiguration by the UE

The UE shall perform the following actions upon reception of the RRCReconfiguration:
1> if the RRCReconfiguration message includes the suspendSCG:
   2> suspend SCG transmission for all SRBs and DRBs;
   2> reset SCG MAC;
1> if the RRCReconfiguration message includes the suspendedSCG-measConfig:
   2> start idle/inactive measurements for the SCG as specified in 5.x.7;

*End Proposed Specification Text*

Alternately, the UE's operation according to these embodiments can be defined by the following alternately procedural text, which can be included in 3GPP TS 38.331 or another 3GPP specification.

*Begin Proposed Specification Text*

5.3.5.3 Reception of an RRCReconfiguration by the UE

The UE shall perform the following actions upon reception of the RRCReconfiguration:
1> if the RRCReconfiguration message includes the suspendSCG:
   2> suspend SCG transmission for all SRBs and DRBs;
   2> reset SCG MAC;
   2> if the UE is already configured with suspendedSCG-measConfig and the RRCReconfiguration message does not include the suspendedSCG-measConfig:
     3> start idle/inactive measurements for the SCG as specified in 5.x.7;
1> if the RRCReconfiguration message includes the suspendedSCG-measConfig:
   2> start idle/inactive measurements for the SCG as specified in 5.x.7;

*End Proposed Specification Text*

It should be noted that the measurement configuration for the suspended SCG doesn't necessarily have to be configured using the idle/inactive measurement structure. It is possible to configure these measurement configurations using normal RRC_CONNECTED measurements based on measurement objects, measurement IDs, etc. The only significant difference is in reporting the measurements. In some embodiments, the reporting configuration can remain unspecified by the network, which the UE can interpret as measurements should be sent only when the network requests them.

Alternately, special conditions for reporting the measurements can be either configured or pre-configured (e.g., defined in 3GPP specifications). For example, the UE could interpret a command to activate the SCG as an implicit command to send an SCG measurement report.

As another example, the UE could interpret the arrival of UL data to be sent on an SCG-terminated bearer while the SCG is suspended as an implicit command and/or indication to send an SCG measurement report. In general, if the UE detects UL data for a radio bearer configured for the SCG, it will send an indication to the network, requesting that the SCG should be resumed. This indication could be, for example, an RRC message or MAC CE sent to the MN or a random access request sent to the SN. In some embodiments, the UE can send the SCG measurement report in the same message as the indication.

For example, FIG. 12 shows an ASN.1 data structure defining an exemplary UEAssistanceInformation message including an indication (e.g., request) to resume the SCG and an SCG measurement report. If the MN receives the exemplary UEAssistanceInformation message containing resumeSCG, the MN can send a message to the UE resuming the SCG. As shown in FIG. 12, the measurement report can include measurements the UE has performed on the suspended SCG for NR cell/carriers, LTE/E-UTRA cells/carriers, or both. Alternately, the UE can send the indication and the SCG measurement report in different messages (e.g., a MAC CE and an RRC message, respectively).

In other embodiments, the UE only includes the resumeSCG indication in the UEAssistanceInformation message, and the network transmits a UEInformationRequest message to the UE, including the indication that the UE shall report early measurement results (as specified in Rel-15). This could be implemented by reusing existing indication (e.g., idleModeMeasurementReq) or by adding new indication (e.g. suspended-MeasurementReq).

The UE would respond with the UEInformationResponse, but instead of including measurements performed while in RRC_IDLE or RRC_INACTIVE, it will include measurements performed on the suspended SCG while in RRC_CONNECTED. The measurement results could either be included in the existing fields measResultIdleEUTRA/measResultIdleNR or be included in a new field (e.g. measResultSuspendedSCG).

In other embodiments, an RRCReconfiguration message is extended to include an indication that the UE should report early measurements for the suspended SCG upon resumption of the SCG. The UE would then include any early measurements for the suspended SCG in the RRCReconfigurationComplete message. FIGS. 13A and 13B, respectively, show ASN.1 data structures defining exemplary RRCReconfiguration and RRCReconfigurationComplete messages according to these embodiments. Operation of the UE according to these embodiments can be further specified by the following text, which can be included in 3GPP TS 38.331 or another 3GPP specification.

*Begin Proposed Specification Text*

5.3.5.3 Reception of an RRCReconfiguration by the UE

The UE shall perform the following actions upon reception of the RRCReconfiguration:
. . .
1> set the content of the RRCReconfigurationComplete message as follows:
   2> if the RRCReconfiguration includes the masterCellGroup containing the reportUplinkTxDirectCurrent; or
   2> if the RRCReconfiguration includes the secondaryCellGroup containing the reportUplinkTxDirectCurrent:

3> include the uplinkTxDirectCurrentList for each serving cell with UL;
3> if UE is configured with SUL carrier:
  4> include uplinkDirectCurrentBWP-SUL for each serving cell with SUL within the uplinkTxDirectCurrentList;
2> if the RRCReconfiguration includes the suspendSCG-MeasurementReq:
  3> if UE is configured with NR SCG and the UE has stored VarMeasIdleReport:
    4> set the nr-SCG-Result in the suspendedSCG-measResult to the value of measReportIdleEUTRA in the VarMeasIdleReport, if available;
  3> if UE is configured with E-UTRA SCG and the UE has stored VarMeasIdleReport:
    4> set the eutra-SCG-Result in the suspendedSCG-measResult to the value of measReportIdleEUTRA in the VarMeasIdleReport, if available;
  3> discard the VarMeasIdleReport upon successful delivery of the RRCReconfigurationComplete message confirmed by lower layers;
. . .

*End Proposed Specification Text*

In general, the embodiments described above are based on measurement configurations for RRC_IDLE and RRC_INACTIVE states. In other embodiments, if the measurement configurations are similar to RRC_CONNECTED measurement configurations (e.g., based on measurement objects, measurement IDs, etc.), then the SCG measurement report can be the same as an RRC_CONNECTED measurement report.

One alternative for the early SCG measurement configuration is that the UE should continue using any connected-mode measurements related to the SCG that the UE was configured with (e.g., by MN or SN) before the SCG suspension but refrain from using the previously-configured reporting configuration after SCG suspension. In other words, the UE continues performing the measurements but defers from reporting them even when the event/periodic trigger conditions are fulfilled. In another alternative, the measurements that were configured by the SN are also suspended when the SCG gets suspended, and but UE continues performing measurements related the SCG that were configured by the MN while the SCG is suspended.

It could be envisioned that the SCG measurements performed by the UE during SCG suspension can be done in a relaxed manner in order to reduce the UE energy consumption. For example, such measurements intermittently instead of continuously, or at a lower frequency as compared to pre-SCG suspension. As an example, ON and OFF periods can be assigned where the UE performs the measurements during the ON period, keeps the results for the OFF duration (where the measurements are considered to be still valid), updated them during the next ON duration, etc.

Figure 14:
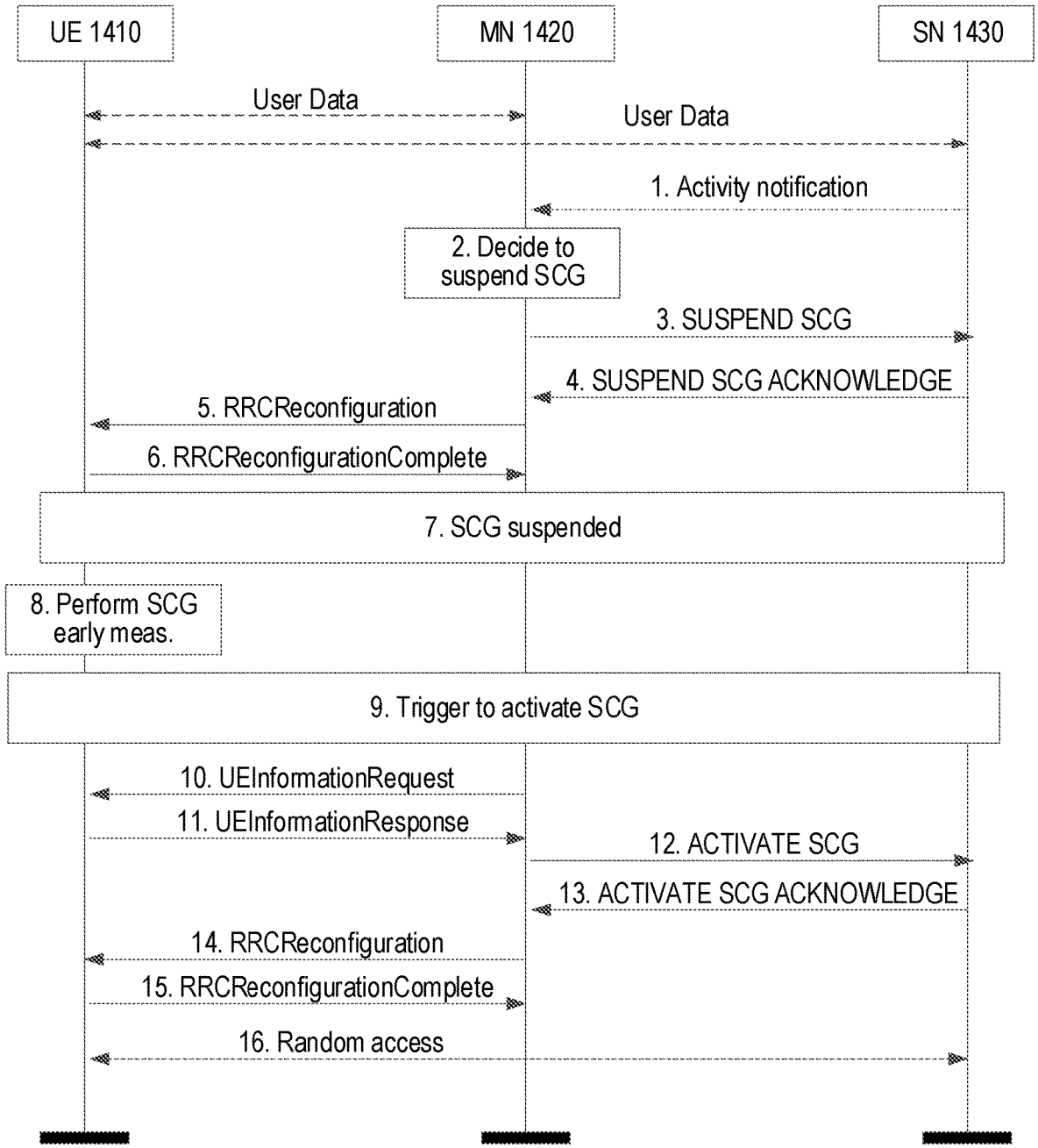
FIG. 14 shows a flow diagram illustrating an exemplary procedure for configuring, performing, and reporting SCG measurements made by a UE while the SCG is suspended, according to various exemplary embodiments of the present disclosure.

FIG. 14 shows a flow diagram illustrating an exemplary procedure for configuring, performing, and reporting SCG measurements made by a UE while the SCG is suspended, according to various exemplary embodiments of the present disclosure. Although the operations shown in FIG. 14 are given numerical labels, these labels are intended to facilitate explanation rather than to limit the operations to occur in a numerical order. In other words, the operations can be performed in different orders than shown and can be combined and/or divided into operations with different functionality than shown.

As a precondition to subsequent operations, the UE is in DC towards a MN and an SN. In operation 1, if the SN detects inactivity on SN-terminated bearers, it may send an activity notification to the MN. In operation 2, the MN decides that the SCG can be suspended, e.g. based on inactivity on MN or SN-terminated SCG or split bearers. In operation 3, the MN transmits an SCG suspend request to the SN. This message could be an extension of an existing SN-Node modification request message, or a new message over the Xn interface.

In operation 4, the SN acknowledges the suspension of the SCG. This message may contain measurement configurations for the suspended SCG. The message could be an extension of an existing SN-Node modification acknowledge message, or a new message over the Xn interface. In operation 5, the MN transmits an RRCReconfiguration message to the UE, which suspends the SCG and possibly configures the UE to perform suspended SCG measurements. In operation 6, the UE acknowledges the suspension of the SCG.

In operation 7, the UE's SCG remains suspended while the UE maintains connectivity via the MCG. In operation 8, the UE performs suspended SCG measurements, possibly until a measurement duration timer expires (if such a timer is configured). In operation 9, certain conditions for activating the SCG are fulfilled. This could be based on a determination made by the MN, the SN, or the UE. For example, if the activation of the SCG is triggered by DL traffic on MN-terminated SCG or split bearers, the MN will trigger the activation. Alternately, if the activation of the SCG is triggered by DL traffic on SN-terminated SCG or split bearers, the SN can transmit an activity notification to the MN, which then triggers the activation. If the activation is triggered by UL traffic on SCG or split bearers with SCG transmission, the UE can transmit a UEAssistanceInformation message indicating the need to activate the SCG.

In operation 10, the MN transmits an UEInformationRequest message including an indication for the UE to report the suspended SCG measurements. In operation 11, the UE transmits a UEInformationResponse message including any suspended SCG measurements. In operation 12, if the received measurements indicate that the UE still has good radio conditions for the suspended SCG, the MN transmits a message to the SN requesting the activation of the SCG. In operation 13, the SN acknowledges the activation of the SCG, possibly providing updated SCG configurations and lower-layer resources (e.g., RACH resources) that the UE may need to access the SN.

In operation 14, the MN configures the UE to activate the SCG. In operation 15, the UE acknowledges the activation of the SCG. In operation 15, if needed, the UE performs a random access procedure to the SCG.

Figure 15:
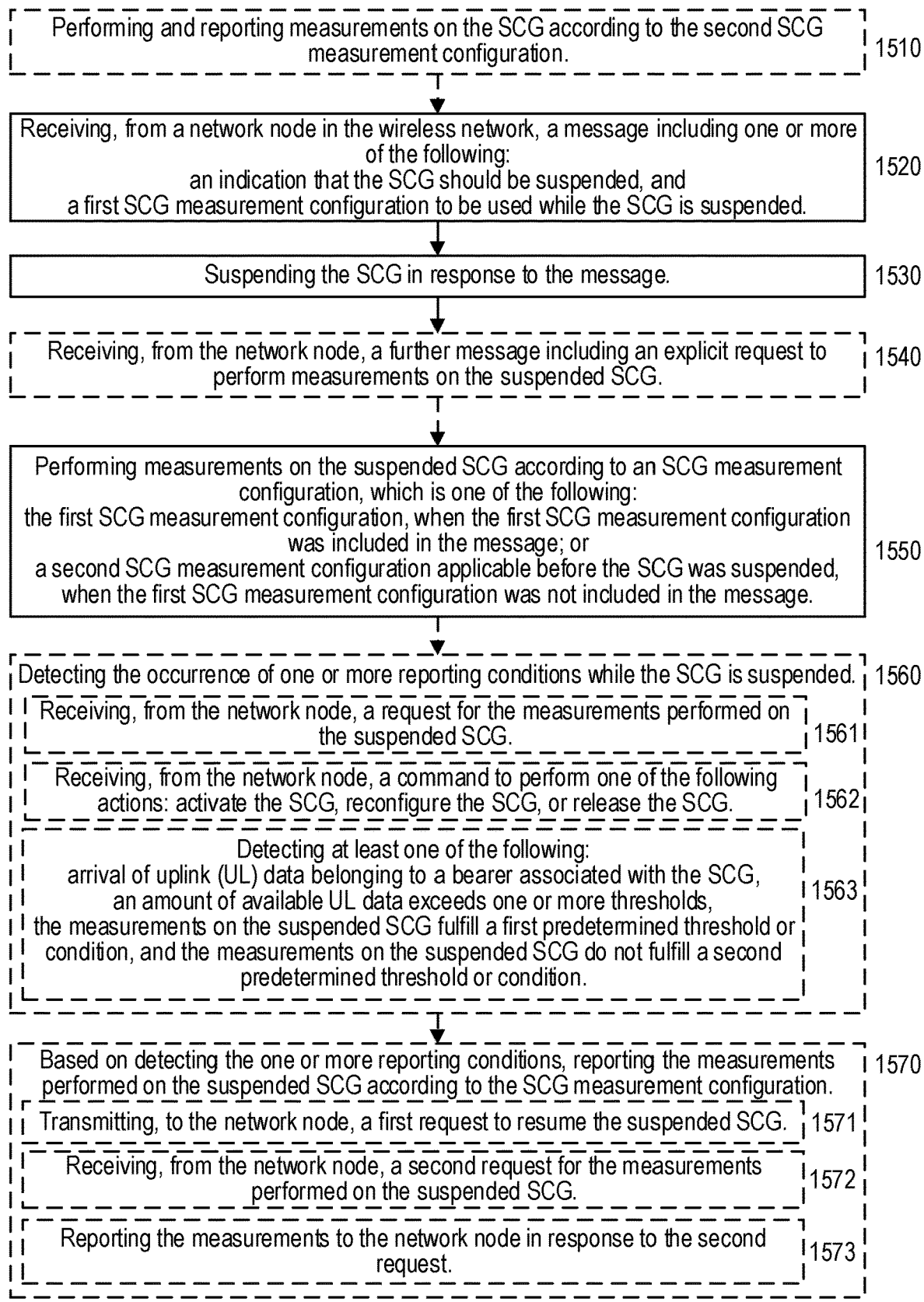
FIG. 15 is a flow diagram illustrating exemplary methods (e.g., procedures) for a UE (e.g., wireless device, MTC device, NB-IoT device, modem, etc. or component thereof), according to various exemplary embodiments of the present disclosure
Figure 16:
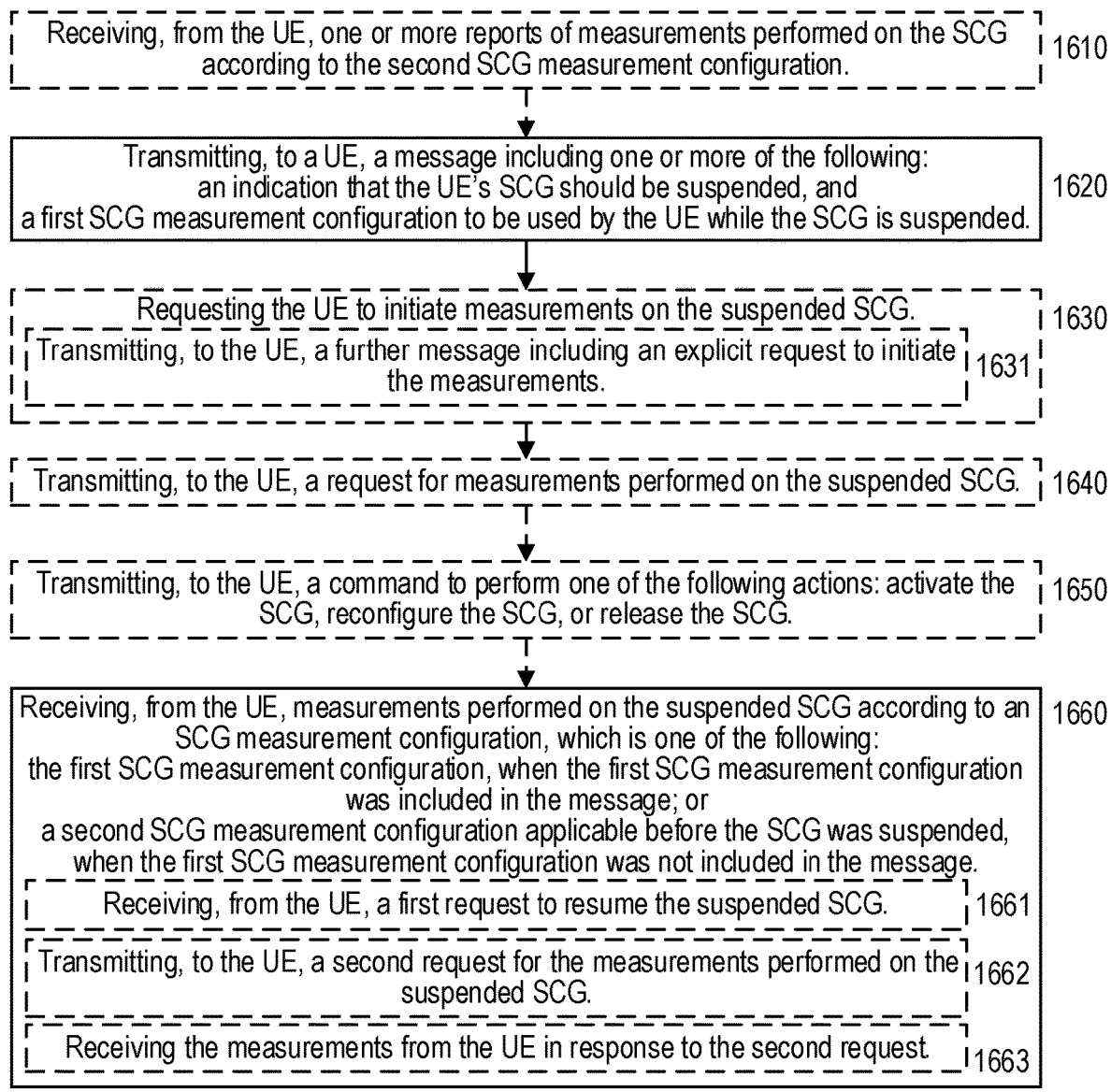
FIG. 16 is a flow diagram illustrating exemplary methods (e.g., procedures) for a network node (e.g., base station, eNB, gNB, ng-eNB, en-gNB, etc., or component thereof), according to various exemplary embodiments of the present disclosure.

The embodiments described above can be further illustrated with reference to FIGS. 15-16, which depict exemplary methods (e.g., procedures) for a UE and a network node, respectively. In other words, various features of the operations described below, with reference to FIGS. 15-16, correspond to various embodiments described above. Although the exemplary methods are illustrated in FIGS. 15-16 by specific blocks in particular orders, the operations corresponding to the blocks can be performed in different orders than shown and can be combined and/or divided into blocks having different functionality than shown. Furthermore, the exemplary methods can be used cooperatively (i.e., with each other, and/or with the exemplary procedure shown in FIG. 15) to provide various benefits, advantages, and/or solutions to problems described herein. Optional blocks and/or operations are indicated by dashed lines.

In particular, FIG. 15 (which includes FIGS. 15A-B) illustrates an exemplary method (e.g., procedure) for performing measurements on a secondary cell group (SCG) in a wireless network while the SCG is suspended, according to various exemplary embodiments of the present disclosure. The exemplary method can be performed by a user equipment (UE, e.g., wireless device, MTC device, NB-IoT device, modem, etc. or component thereof) in communication with a network node (e.g., base station, eNB, gNB, etc., or components thereof) via a master cell group (MCG). For example, the exemplary method can be implemented in a UE configured according to other figures described herein.

The exemplary method can include the operations of block 1520, where the UE can receive, from a network node in the wireless network, a message including an indication that the SCG should be suspended, and/or a first SCG measurement configuration to be used while the SCG is suspended. In various embodiments, the message can be received from one of the following: a master node (MN) providing the UE's master cell group (MCG); a secondary node (SN) providing the SCG; or the MN including content generated by the SN.

The exemplary method can also include the operations of block 1530, where the UE can suspend the SCG in response to the message. The exemplary method can also include the operations of block 1550, where the UE can perform measurements on the suspended SCG according to an SCG measurement configuration. The SCG measurement configuration can be the first SCG measurement configuration when the same was included in the message (i.e., in block 1520); or a second SCG measurement configuration applicable before the SCG was suspended, when the first SCG measurement configuration was not included in the message.

In some embodiments, the exemplary method can also include the operations of block 1510, where the UE can, before receiving the message, perform and report measurements on the SCG according to the second SCG measurement configuration. For example, these measurements can be performed by the UE before the SCG was suspended.

In some embodiments, performing the measurements on the suspended SCG (e.g., in block 1550) can be responsive to receiving the message (e.g., in block 1520) including the indication that the SCG should be suspended. In other embodiments, performing the measurements on the suspended SCG (e.g., in block 1550) can be responsive to the operations of block 1540, where the UE can receive, from the network node, a further message including an explicit request to initiate the measurements.

In some embodiments, the exemplary method can also include the operations of blocks 1560-1570. In block 1560, the UE can detect the occurrence of one or more reporting conditions while the SCG is suspended. In block 1570, the UE can, based on detecting the one or more reporting conditions, report the measurements performed on the suspended SCG according to the SCG measurement configuration. In some embodiments, the one or more reporting conditions can be included in the SCG measurement configuration (e.g., the first or second SCG measurement configuration). In other words, the SCG measurement configuration can inform the UE about the reporting conditions that it should detect (e.g., in block 1560).

In some of these embodiments, the detecting operations of block 1560 can include the operations of sub-block 1561, where the UE can receive, from the network node, a request for the measurements performed on the suspended SCG. The reporting operations in block 1570 can be responsive to that request.

In other of these embodiments, the detecting operations of block 1560 can include the operations of sub-block 1562, where the UE can receive, from the network node, a command to perform one of the following actions: activate the SCG, reconfigure the SCG, or release the SCG.

The reporting operations in block 1570 can be responsive to that command. In some embodiments, the command can include an explicit request to report the measurements on the suspended SCG upon performing the action associated with the command.

In other of these embodiments, the detecting operations of block 1560 can include the operations of sub-block 1563, where the UE can detect at least one of the following:
  arrival of uplink (UL) data, at the UE, belonging to a bearer associated with the SCG;
  an amount of available UL data, at the UE, exceeds one or more thresholds;
  the measurements on the suspended SCG fulfill a first predetermined threshold or condition; and
  the measurements on the suspended SCG do not fulfill a second predetermined threshold or condition.

In such embodiments, the reporting operations of block 1570 can include the operations of block 1571, where the UE can transmit, to the network node, a first request to resume the suspended SCG. In one variant of such embodiments, the measurements can be included with the first request.

In another variant of such embodiments, the reporting operations of block 1570 can also include the operations of sub-blocks 1572-1573. In sub-block 1572, the UE can receive, from the network node (e.g., in response to the first request), a second request for the measurements performed on the suspended SCG. In sub-block 1573, the UE can report the measurements to the network node in response to the second request.

In addition, FIG. 16 illustrates an exemplary method (e.g., procedure) for configuring user equipment (UE) measurements on a secondary cell group (SCG) in a wireless network while the SCG is suspended, according to various exemplary embodiments of the present disclosure. The exemplary method shown in FIG. 16 can be performed by one or more network nodes (e.g., base stations, eNBs, gNBs, etc., or component thereof) in the wireless network (e.g., E-UTRAN, NG-RAN). For example, the exemplary method shown in FIG. 16 can be implemented in a network node configured according to other figures described herein.

The exemplary method can include the operations of block 1620, where the network node can transmit, to the UE, a message including an indication that the UE's SCG should be suspended, and/or a first SCG measurement configuration to be used by the UE while the UE's SCG is suspended. In various embodiments, the message can be transmitted by one of the following: a master node (MN) providing the UE's master cell group (MCG); a secondary node (SN) providing the SCG; or the MN including content generated by the SN.

The exemplary method can also include the operations of block 1660, in which the network node can receive, from the UE, measurements performed on the suspended SCG according to an SCG measurement configuration. The SCG measurement configuration can be the first SCG measurement configuration, when the first measurement configuration was included in the message (i.e., transmitted in block 1620); or a second SCG measurement configuration applicable before the UE's SCG was suspended, when the first SCG measurement configuration was not included in the message.

In some embodiments, the exemplary method can also include the operations of block 1610, where the network node can receive, from the UE before transmitting the message (e.g., in block 1620), one or more reports of measurements performed on the SCG according to the second SCG measurement configuration. For example, these measurements can be performed by the UE before the SCG was suspended.

In some embodiments, the exemplary method can also include the operations of block 1630, where the network node can request the UE to initiate measurements on the suspended SCG. In some embodiments, this request can be based on (e.g., explicitly or implicitly) the message including the indication that the SCG should be suspended (e.g., in block 1620). In other embodiments, requesting the UE to initiate the measurements can include the operations of sub-block 1631, where the network node can transmit, to the UE, a further message including an explicit request to initiate the measurements.

In some embodiments, the exemplary method can also include the operations of block 1640, where the network node can transmit, to the UE, a request for measurements performed on the suspended SCG. The measurements performed on the suspended SCG can be received (e.g., in block 1660) from the UE in response to the request.

In other embodiments, the exemplary method can also include the operations of block 1650, where the network node can transmit, to the UE while the SCG is suspended, a command to perform one of the following actions: activate the SCG, reconfigure the SCG, or release the SCG. The measurements performed on the suspended SCG can be received (e.g., in block 1660) from the UE in response to the command. In some embodiments, the command can include an explicit request to report the measurements on the suspended SCG upon performing the action associated with the command.

In other embodiments, the measurements performed on the suspended SCG can be received (e.g., in block 1660) in response to the UE detecting at least one of the following:
- arrival of uplink (UL) data, at the UE, belonging to a bearer associated with the SCG;
- an amount of available UL data, at the UE, exceeds one or more thresholds;
- the measurements on the suspended SCG fulfill a first predetermined threshold or condition; and
- the measurements on the suspended SCG do not fulfill a second predetermined threshold or condition.

In such embodiments, the receiving operations of block 1660 can include the operations of block 1661, where the network node can receive, from the UE, a first request to resume the suspended SCG. In one variant of such embodiments, the measurements can be included with the first request.

In another variant of such embodiments, the receiving operations of block 1660 can also include the operations of sub-blocks 1662-1663. In sub-block 1662, the network node can transmit, to the UE (e.g., in response to the first request), a second request for the measurements performed on the suspended SCG. In sub-block 1663, the network node can receive the measurements from the UE in response to the second request.

Figure 17:
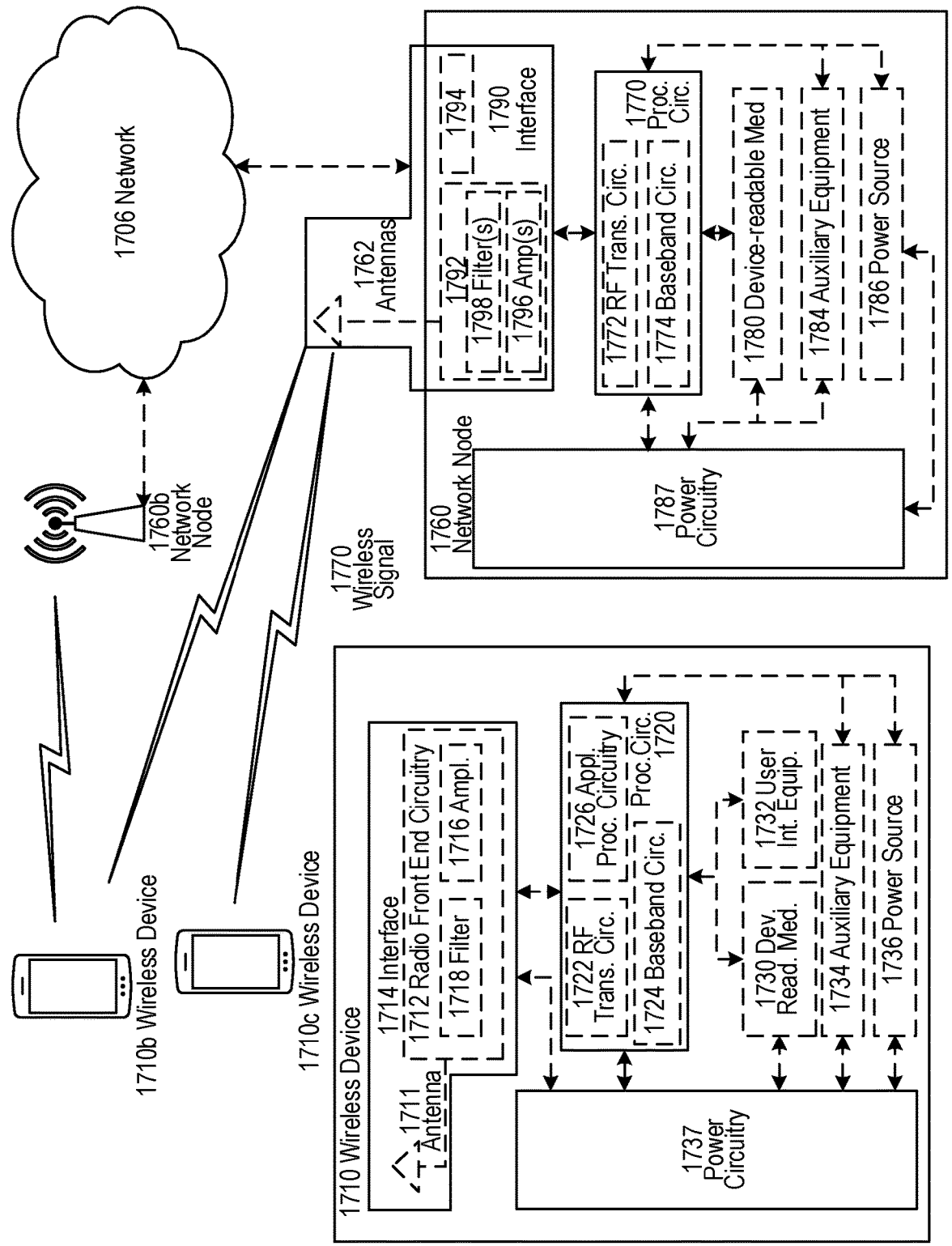
FIG. 17 illustrates an exemplary embodiment of a wireless network, in accordance with various aspects described herein.

Although the subject matter described herein can be implemented in any appropriate type of system using any suitable components, the embodiments disclosed herein are described in relation to a wireless network, such as the example wireless network illustrated in FIG. 17. For simplicity, the wireless network of FIG. 17 only depicts network 1706, network nodes 1760 and 1760*b*, and WDs 1710, 1710*b*, and 1710*c*. In practice, a wireless network can further include any additional elements suitable to support communication between wireless devices or between a wireless device and another communication device, such as a landline telephone, a service provider, or any other network node or end device. Of the illustrated components, network node 1760 and wireless device (WD) 1710 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1706 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1760 and WD 1710 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 17, network node 1760 includes processing circuitry 1770, device readable medium 1780, interface 1790, auxiliary equipment 1784, power source 1786, power circuitry 1787, and antenna 1762. Although network node 1760 illustrated in the example wireless network of FIG. 17 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 1760 are depicted as single boxes located within a larger box, or nested within multiple boxes, in practice, a network node can comprise multiple different physical components that make up a single illustrated component (e.g., device readable medium 1780 can comprise multiple separate hard drives as well as multiple RAM modules).

Similarly, network node 1760 can be composed of multiple physically separate components (e.g., a NodeB component and a RNC component, or a BTS component and a BSC component, etc.), which can each have their own respective components. In certain scenarios in which network node 1760 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 1760 can be configured to support multiple radio access technologies (RATs). In such embodiments, some components can be duplicated (e.g., separate device readable medium 1780 for the different RATs) and some components can be reused (e.g., the same antenna 1762 can be shared by the RATs). Network node 1760 can also include multiple sets of the various illustrated components for different wireless technologies integrated into network node 1760, such as, for example, GSM, WCDMA, LTE, NR, WiFi, or Bluetooth wireless technologies. These wireless technologies can be integrated into the same or different chip or set of chips and other components within network node 1760.

Processing circuitry 1770 can be configured to perform any determining, calculating, or similar operations (e.g., certain obtaining operations) described herein as being provided by a network node. These operations performed by processing circuitry 1770 can include processing information obtained by processing circuitry 1770 by, for example, converting the obtained information into other information, comparing the obtained information or converted information to information stored in the network node, and/or performing one or more operations based on the obtained information or converted information, and as a result of said processing making a determination.

Processing circuitry 1770 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 1760, either alone or in conjunction with other network node 1760 components (e.g., device readable medium 1780). Such functionality can include any of the various wireless features, functions, or benefits discussed herein.

For example, processing circuitry 1770 can execute instructions stored in device readable medium 1780 or in memory within processing circuitry 1770. In some embodiments, processing circuitry 1770 can include a system on a chip (SOC). As a more specific example, instructions (also referred to as a computer program product) stored in medium 1780 can include instructions that, when executed by processing circuitry 1770, can configure network node 1760 to perform operations corresponding to various exemplary methods (e.g., procedures) described herein.

In some embodiments, processing circuitry 1770 can include one or more of radio frequency (RF) transceiver circuitry 1772 and baseband processing circuitry 1774. In some embodiments, radio frequency (RF) transceiver circuitry 1772 and baseband processing circuitry 1774 can be on separate chips (or sets of chips), boards, or units, such as radio units and digital units. In alternative embodiments, part or all of RF transceiver circuitry 1772 and baseband processing circuitry 1774 can be on the same chip or set of chips, boards, or units In certain embodiments, some or all of the functionality described herein as being provided by a network node, base station, eNB or other such network device can be performed by processing circuitry 1770 executing instructions stored on device readable medium 1780 or memory within processing circuitry 1770. In alternative embodiments, some or all of the functionality can be provided by processing circuitry 1770 without executing instructions stored on a separate or discrete device readable medium, such as in a hard-wired manner. In any of those embodiments, whether executing instructions stored on a device readable storage medium or not, processing circuitry 1770 can be configured to perform the described functionality. The benefits provided by such functionality are not limited to processing circuitry 1770 alone or to other components of network node 1760 but are enjoyed by network node 1760 as a whole, and/or by end users and the wireless network generally.

Device readable medium 1780 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 1770. Device readable medium 1780 can store any suitable instructions, data or information, including a computer program, software, an application including one or more of logic, rules, code, tables, etc. and/or other instructions capable of being executed by processing circuitry 1770 and, utilized by network node 1760. Device readable medium 1780 can be used to store any calculations made by processing circuitry 1770 and/or any data received via interface 1790. In some embodiments, processing circuitry 1770 and device readable medium 1780 can be considered to be integrated.

Interface 1790 is used in the wired or wireless communication of signaling and/or data between network node 1760, network 1706, and/or WDs 1710. As illustrated, interface 1790 comprises port(s)/terminal(s) 1794 to send and receive data, for example to and from network 1706 over a wired connection. Interface 1790 also includes radio front end circuitry 1792 that can be coupled to, or in certain embodiments a part of, antenna 1762. Radio front end circuitry 1792 comprises filters 1798 and amplifiers 1796. Radio front end circuitry 1792 can be connected to antenna 1762 and processing circuitry 1770. Radio front end circuitry can be configured to condition signals communicated between antenna 1762 and processing circuitry 1770. Radio front end circuitry 1792 can receive digital data that is to be sent out to other network nodes or WDs via a wireless connection. Radio front end circuitry 1792 can convert the digital data into a radio signal having the appropriate channel and bandwidth parameters using a combination of filters 1798 and/or amplifiers 1796. The radio signal can then be transmitted via antenna 1762. Similarly, when receiving data, antenna 1762 can collect radio signals which are then converted into digital data by radio front end circuitry 1792. The digital data can be passed to processing circuitry 1770. In other embodiments, the interface can comprise different components and/or different combinations of components.

In certain alternative embodiments, network node 1760 may not include separate radio front end circuitry 1792, instead, processing circuitry 1770 can comprise radio front end circuitry and can be connected to antenna 1762 without separate radio front end circuitry 1792. Similarly, in some embodiments, all or some of RF transceiver circuitry 1772 can be considered a part of interface 1790. In still other embodiments, interface 1790 can include one or more ports or terminals 1794, radio front end circuitry 1792, and RF transceiver circuitry 1772, as part of a radio unit (not shown), and interface 1790 can communicate with baseband processing circuitry 1774, which is part of a digital unit (not shown).

Antenna 1762 can include one or more antennas, or antenna arrays, configured to send and/or receive wireless signals. Antenna 1762 can be coupled to radio front end circuitry 1790 and can be any type of antenna capable of transmitting and receiving data and/or signals wirelessly. In some embodiments, antenna 1762 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 1762 can be separate from network node 1760 and can be connectable to network node 1760 through an interface or port.

Antenna 1762, interface 1790, and/or processing circuitry 1770 can be configured to perform any receiving operations and/or certain obtaining operations described herein as being performed by a network node. Any information, data and/or signals can be received from a wireless device, another network node and/or any other network equipment. Similarly, antenna 1762, interface 1790, and/or processing circuitry 1770 can be configured to perform any transmitting operations described herein as being performed by a network node. Any information, data and/or signals can be transmitted to a wireless device, another network node and/or any other network equipment.

Power circuitry 1787 can comprise, or be coupled to, power management circuitry and can be configured to supply the components of network node 1760 with power for performing the functionality described herein. Power circuitry 1787 can receive power from power source 1786. Power source 1786 and/or power circuitry 1787 can be configured to provide power to the various components of network node 1760 in a form suitable for the respective components (e.g., at a voltage and current level needed for each respective component). Power source 1786 can either be included in, or external to, power circuitry 1787 and/or network node 1760. For example, network node 1760 can be connectable to an external power source (e.g., an electricity outlet) via an input circuitry or interface such as an electrical cable, whereby the external power source supplies power to power circuitry 1787. As a further example, power source 1786 can comprise a source of power in the form of a battery or battery pack which is connected to, or integrated in, power circuitry 1787. The battery can provide backup power should the external power source fail. Other types of power sources, such as photovoltaic devices, can also be used.

Alternative embodiments of network node 1760 can include additional components beyond those shown in FIG. 17 that can be responsible for providing certain aspects of the network node's functionality, including any of the functionality described herein and/or any functionality necessary to support the subject matter described herein. For example, network node 1760 can include user interface equipment to allow and/or facilitate input of information into network node 1760 and to allow and/or facilitate output of information from network node 1760. This can allow and/or facilitate a user to perform diagnostic, maintenance, repair, and other administrative functions for network node 1760.

In some embodiments, a wireless device (WD, e.g., WD 1710) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 1710 includes antenna 1711, interface 1714, processing circuitry 1720, device readable medium 1730, user interface equipment 1732, auxiliary equipment 1734, power source 1736 and power circuitry 1737. WD 1710 can include multiple sets of one or more of the illustrated components for different wireless technologies supported by WD 1710, such as, for example, GSM, WCDMA, LTE, NR, WiFi, WiMAX, or Bluetooth wireless technologies, just to mention a few. These wireless technologies can be integrated into the same or different chips or set of chips as other components within WD 1710.

Antenna 1711 can include one or more antennas or antenna arrays, configured to send and/or receive wireless signals, and is connected to interface 1714. In certain alternative embodiments, antenna 1711 can be separate from WD 1710 and be connectable to WD 1710 through an interface or port. Antenna 1711, interface 1714, and/or processing circuitry 1720 can be configured to perform any receiving or transmitting operations described herein as being performed by a WD. Any information, data and/or signals can be received from a network node and/or another WD. In some embodiments, radio front end circuitry and/or antenna 1711 can be considered an interface.

As illustrated, interface 1714 comprises radio front end circuitry 1712 and antenna 1711. Radio front end circuitry 1712 comprise one or more filters 1718 and amplifiers 1715. Radio front end circuitry 1714 is connected to antenna 1711 and processing circuitry 1720 and can be configured to condition signals communicated between antenna 1711 and processing circuitry 1720. Radio front end circuitry 1712 can be coupled to or a part of antenna 1711. In some embodiments, WD 1710 may not include separate radio front end circuitry 1712; rather, processing circuitry 1720 can comprise radio front end circuitry and can be connected to antenna 1711. Similarly, in some embodiments, some or all of RF transceiver circuitry 1722 can be considered a part of interface 1714. Radio front end circuitry 1712 can receive digital data that is to be sent out to other network nodes or WDs via a wireless connection. Radio front end circuitry 1712 can convert the digital data into a radio signal having the appropriate channel and bandwidth parameters using a combination of filters 1718 and/or amplifiers 1715. The radio signal can then be transmitted via antenna 1711. Similarly, when receiving data, antenna 1711 can collect radio signals which are then converted into digital data by radio front end circuitry 1712. The digital data can be passed to processing circuitry 1720. In other embodiments, the interface can comprise different components and/or different combinations of components.

Processing circuitry 1720 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 1710 functionality either alone or in combination with other WD 1710 components, such as device readable medium 1730. Such functionality can include any of the various wireless features or benefits discussed herein.

For example, processing circuitry 1720 can execute instructions stored in device readable medium 1730 or in memory within processing circuitry 1720 to provide the functionality disclosed herein. More specifically, instructions (also referred to as a computer program product) stored in medium 1730 can include instructions that, when executed by processor 1720, can configure wireless device 1710 to perform operations corresponding to various exemplary methods (e.g., procedures) described herein.

As illustrated, processing circuitry 1720 includes one or more of RF transceiver circuitry 1722, baseband processing circuitry 1724, and application processing circuitry 1726. In other embodiments, the processing circuitry can comprise different components and/or different combinations of components. In certain embodiments processing circuitry 1720 of WD 1710 can comprise a SOC. In some embodiments, RF transceiver circuitry 1722, baseband processing circuitry 1724, and application processing circuitry 1726 can be on separate chips or sets of chips. In alternative embodiments, part or all of baseband processing circuitry 1724 and application processing circuitry 1726 can be combined into one chip or set of chips, and RF transceiver circuitry 1722 can be on a separate chip or set of chips. In still alternative embodiments, part or all of RF transceiver circuitry 1722 and baseband processing circuitry 1724 can be on the same chip or set of chips, and application processing circuitry 1726 can be on a separate chip or set of chips. In yet other alternative embodiments, part or all of RF transceiver circuitry 1722, baseband processing circuitry 1724, and application processing circuitry 1726 can be combined in the same chip or set of chips. In some embodiments, RF transceiver circuitry 1722 can be a part of interface 1714. RF transceiver circuitry 1722 can condition RF signals for processing circuitry 1720.

In certain embodiments, some or all of the functionality described herein as being performed by a WD can be provided by processing circuitry 1720 executing instructions stored on device readable medium 1730, which in certain embodiments can be a computer-readable storage medium. In alternative embodiments, some or all of the functionality can be provided by processing circuitry 1720 without executing instructions stored on a separate or discrete device readable storage medium, such as in a hard-wired manner. In any of those particular embodiments, whether executing instructions stored on a device readable storage medium or not, processing circuitry 1720 can be configured to perform the described functionality. The benefits provided by such functionality are not limited to processing circuitry 1720 alone or to other components of WD 1710, but are enjoyed by WD 1710 as a whole, and/or by end users and the wireless network generally.

Processing circuitry 1720 can be configured to perform any determining, calculating, or similar operations (e.g., certain obtaining operations) described herein as being performed by a WD. These operations, as performed by processing circuitry 1720, can include processing information obtained by processing circuitry 1720 by, for example, converting the obtained information into other information, comparing the obtained information or converted information to information stored by WD 1710, and/or performing one or more operations based on the obtained information or converted information, and as a result of said processing making a determination.

Device readable medium 1730 can be operable to store a computer program, software, an application including one or more of logic, rules, code, tables, etc. and/or other instructions capable of being executed by processing circuitry 1720. Device readable medium 1730 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 1720. In some embodiments, processing circuitry 1720 and device readable medium 1730 can be considered to be integrated.

User interface equipment 1732 can include components that allow and/or facilitate a human user to interact with WD 1710. Such interaction can be of many forms, such as visual, audial, tactile, etc. User interface equipment 1732 can be operable to produce output to the user and to allow and/or facilitate the user to provide input to WD 1710. The type of interaction can vary depending on the type of user interface equipment 1732 installed in WD 1710. For example, if WD 1710 is a smart phone, the interaction can be via a touch screen; if WD 1710 is a smart meter, the interaction can be through a screen that provides usage (e.g., the number of gallons used) or a speaker that provides an audible alert (e.g., if smoke is detected). User interface equipment 1732 can include input interfaces, devices and circuits, and output interfaces, devices and circuits. User interface equipment 1732 can be configured to allow and/or facilitate input of information into WD 1710 and is connected to processing circuitry 1720 to allow and/or facilitate processing circuitry 1720 to process the input information. User interface equipment 1732 can include, for example, a microphone, a proximity or other sensor, keys/buttons, a touch display, one or more cameras, a USB port, or other input circuitry. User interface equipment 1732 is also configured to allow and/or facilitate output of information from WD 1710, and to allow and/or facilitate processing circuitry 1720 to output information from WD 1710. User interface equipment 1732 can include, for example, a speaker, a display, vibrating circuitry, a USB port, a headphone interface, or other output circuitry. Using one or more input and output interfaces, devices, and circuits, of user interface equipment 1732, WD 1710 can communicate with end users and/or the wireless network and allow and/or facilitate them to benefit from the functionality described herein.

Auxiliary equipment 1734 is operable to provide more specific functionality which may not be generally performed by WDs. This can comprise specialized sensors for doing measurements for various purposes, interfaces for additional types of communication such as wired communications etc. The inclusion and type of components of auxiliary equipment 1734 can vary depending on the embodiment and/or scenario.

Power source 1736 can, in some embodiments, be in the form of a battery or battery pack. Other types of power sources, such as an external power source (e.g., an electricity outlet), photovoltaic devices or power cells, can also be used. WD 1710 can further comprise power circuitry 1737 for delivering power from power source 1736 to the various parts of WD 1710 which need power from power source 1736 to carry out any functionality described or indicated herein. Power circuitry 1737 can in certain embodiments comprise power management circuitry. Power circuitry 1737 can additionally or alternatively be operable to receive power from an external power source; in which case WD 1710 can be connectable to the external power source (such as an electricity outlet) via input circuitry or an interface such as an electrical power cable. Power circuitry 1737 can also in certain embodiments be operable to deliver power from an external power source to power source 1736. This can be, for example, for the charging of power source 1736. Power circuitry 1737 can perform any converting or other modification to the power from power source 1736 to make it suitable for supply to the respective components of WD 1710.

Figure 18:
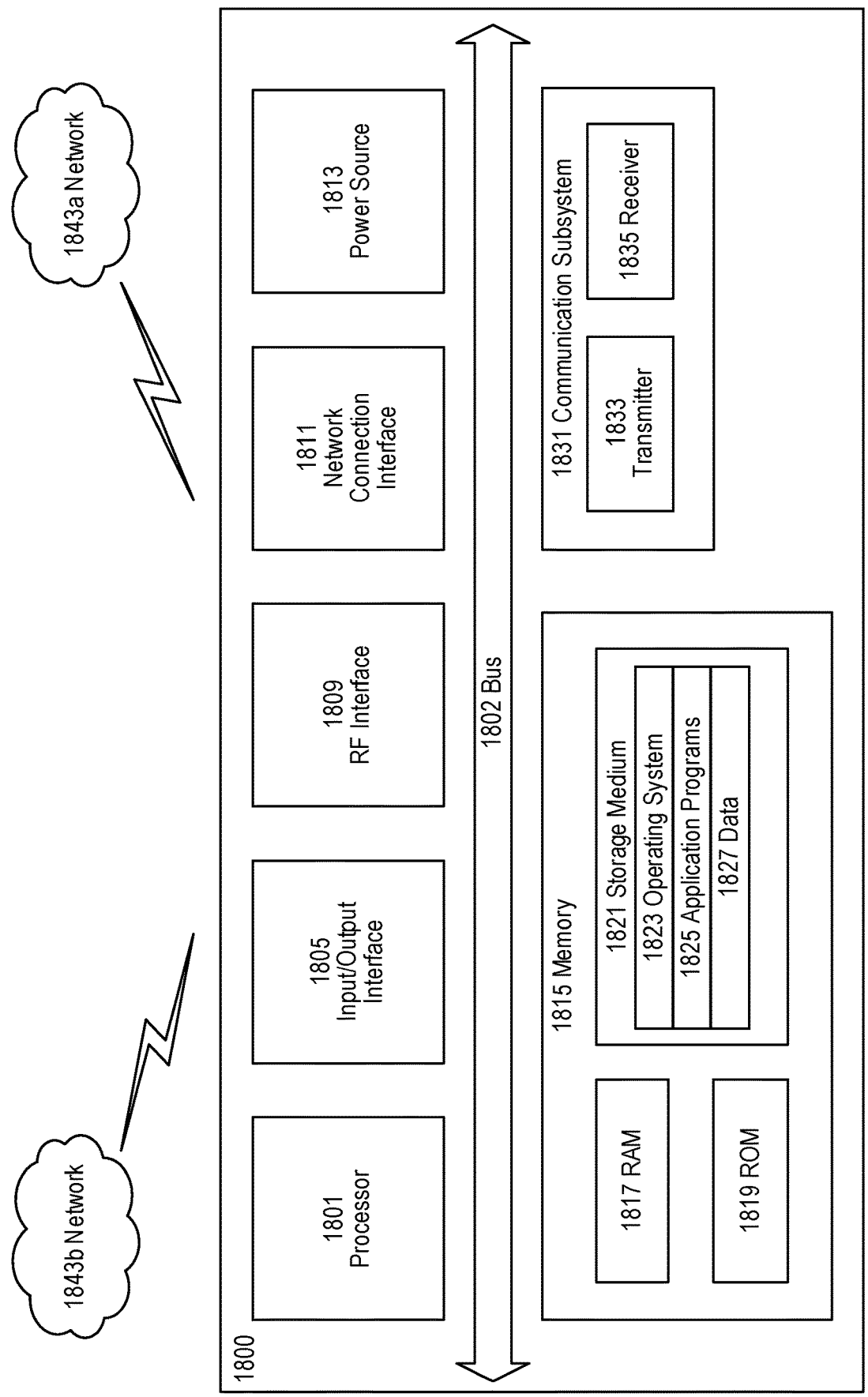
FIG. 18 illustrates an exemplary embodiment of a UE, in accordance with various aspects described herein.

FIG. 18 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 1800 can be any UE identified by the $3^{rd}$ Generation Partnership Project (3GPP), including a NB-IoT UE, a machine type communication (MTC) UE, and/or an enhanced MTC (eMTC) UE. UE 1800, as illustrated in FIG. 18, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 18 is a UE, the components discussed herein are equally applicable to a WD, and vice-versa.

In FIG. 18, UE 1800 includes processing circuitry 1801 that is operatively coupled to input/output interface 1805, radio frequency (RF) interface 1809, network connection interface 1811, memory 1815 including random access memory (RAM) 1816, read-only memory (ROM) 1819, and storage medium 1821 or the like, communication subsystem 1831, power source 1833, and/or any other component, or any combination thereof. Storage medium 1821 includes operating system 1823, application program 1825, and data 1827. In other embodiments, storage medium 1821 can include other similar types of information. Certain UEs can utilize all of the components shown in FIG. 18, or only a subset of the components. The level of integration between the components can vary from one UE to another UE. Further, certain UEs can contain multiple instances of a component, such as multiple processors, memories, transceivers, transmitters, receivers, etc.

In FIG. 18, processing circuitry 1801 can be configured to process computer instructions and data. Processing circuitry 1801 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1801 can include two central processing units (CPUs). Data can be information in a form suitable for use by a computer.

In the depicted embodiment, input/output interface 1805 can be configured to provide a communication interface to an input device, output device, or input and output device. UE 1800 can be configured to use an output device via input/output interface 1805. An output device can use the same type of interface port as an input device. For example, a USB port can be used to provide input to and output from UE 1800. The output device can be a speaker, a sound card, a video card, a display, a monitor, a printer, an actuator, an emitter, a smartcard, another output device, or any combination thereof. UE 1800 can be configured to use an input device via input/output interface 1805 to allow and/or facilitate a user to capture information into UE 1800. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 18, RF interface 1809 can be configured to provide a communication interface to RF components such as a transmitter, a receiver, and an antenna. Network connection interface 1811 can be configured to provide a communication interface to network 1843a. Network 1843a can encompass wired and/or wireless networks such as a local-area network (LAN), a wide-area network (WAN), a computer network, a wireless network, a telecommunications network, another like network or any combination thereof. For example, network 1843a can comprise a Wi-Fi network. Network connection interface 1811 can be configured to include a receiver and a transmitter interface used to communicate with one or more other devices over a communication network according to one or more communication protocols, such as Ethernet, TCP/IP, SONET, ATM, or the like. Network connection interface 1811 can implement receiver and transmitter functionality appropriate to the communication network links (e.g., optical, electrical, and the like). The transmitter and receiver functions can share circuit components, software or firmware, or alternatively can be implemented separately.

RAM 1816 can be configured to interface via bus 1802 to processing circuitry 1801 to provide storage or caching of data or computer instructions during the execution of software programs such as the operating system, application programs, and device drivers. ROM 1819 can be configured to provide computer instructions or data to processing circuitry 1801. For example, ROM 1819 can be configured to store invariant low-level system code or data for basic system functions such as basic input and output (I/O), startup, or reception of keystrokes from a keyboard that are stored in a non-volatile memory. Storage medium 1821 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 1821 can be configured to include operating system 1823; application program 1825 such as a web browser application, a widget or gadget engine or another application; and data file 1827. Storage medium 1821 can store, for use by UE 1800, any of a variety of various operating systems or combinations of operating systems. For example, application program 1825 can include executable program instructions (also referred to as a computer program product) that, when executed by processor 1801, can configure UE 1800 to perform operations corresponding to various exemplary methods (e.g., procedures) described herein.

Storage medium 1821 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1821 can allow and/or facilitate UE 1800 to access computer-executable instructions, application programs or the like, stored on transitory or non-transitory memory media, to off-load data, or to upload data. An article of manufacture, such as one utilizing a communication system can be tangibly embodied in storage medium 1821, which can comprise a device readable medium.

In FIG. 18, processing circuitry 1801 can be configured to communicate with network 1843b using communication subsystem 1831. Network 1843a and network 1843b can be the same network or networks or different network or networks. Communication subsystem 1831 can be configured to include one or more transceivers used to communicate with network 1843b. For example, communication subsystem 1831 can be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver can include transmitter 1833 and/or receiver 1835 to implement transmitter or receiver functionality, respectively, appropriate to the RAN links (e.g., frequency allocations and the like). Further, transmitter 1833 and receiver 1835 of each transceiver can share circuit components, software or firmware, or alternatively can be implemented separately.

In the illustrated embodiment, the communication functions of communication subsystem 1831 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 1831 can include cellular communication, Wi-Fi communication, Bluetooth communication, and GPS communication. Network 1843b can encompass wired and/or wireless networks such as a local-area network (LAN), a wide-area network (WAN), a computer network, a wireless network, a telecommunications network, another like network or any combination thereof. For example, network 1843b can be a cellular network, a Wi-Fi network, and/or a near-field network. Power source 1813 can be configured to provide alternating current (AC) or direct current (DC) power to components of UE 1800.

The features, benefits and/or functions described herein can be implemented in one of the components of UE 1800 or partitioned across multiple components of UE 1800. Further, the features, benefits, and/or functions described herein can be implemented in any combination of hardware, software or firmware. In one example, communication subsystem 1831 can be configured to include any of the components described herein. Further, processing circuitry 1801 can be configured to communicate with any of such components over bus 1802. In another example, any of such components can be represented by program instructions stored in memory that when executed by processing circuitry 1801 perform the corresponding functions described herein. In another example, the functionality of any of such components can be partitioned between processing circuitry 1801 and communication subsystem 1831. In another example, the non-computationally intensive functions of any of such components can be implemented in software or firmware and the computationally intensive functions can be implemented in hardware.

Figure 19:
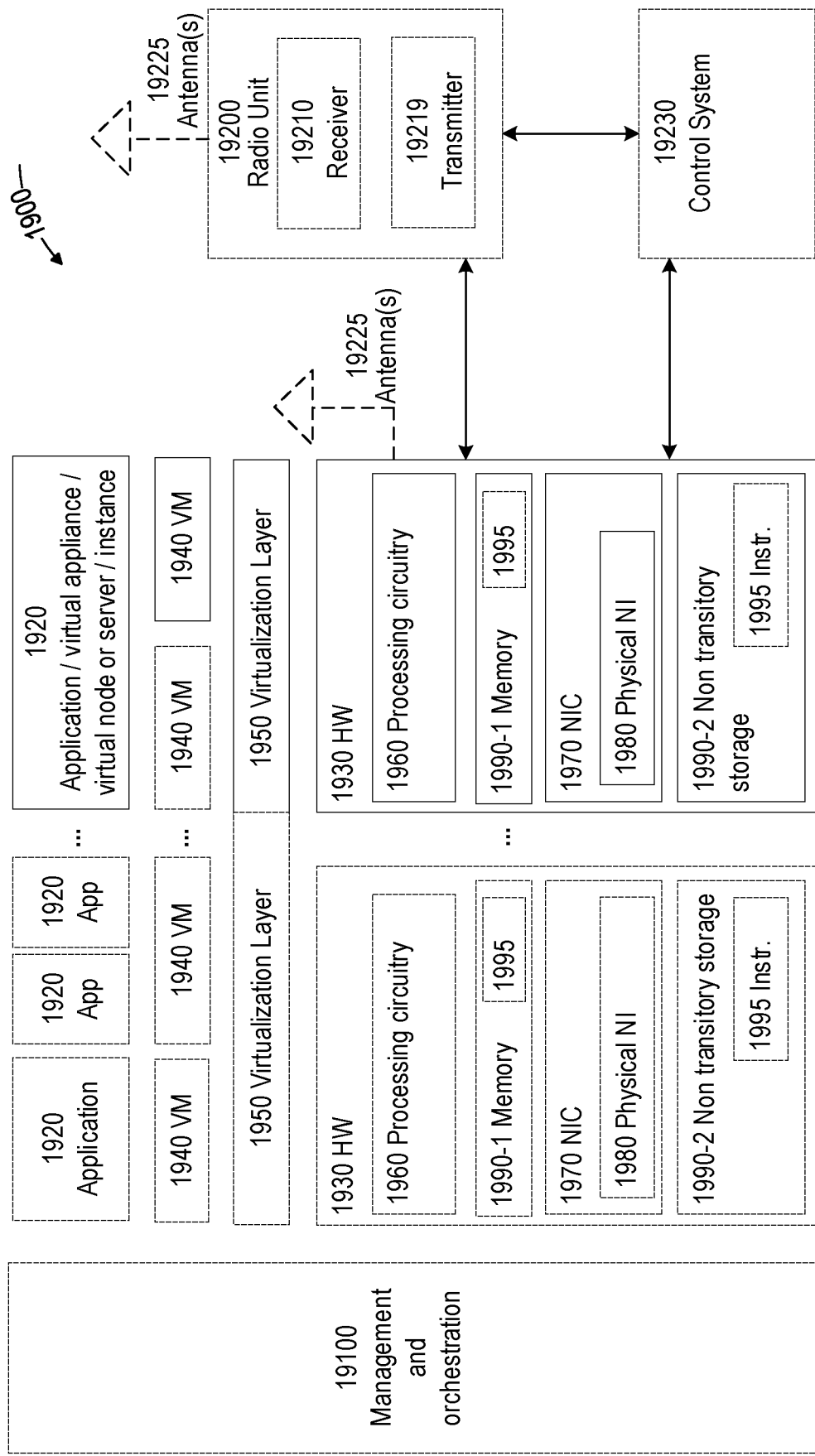
FIG. 19 is a block diagram illustrating an exemplary virtualization environment usable for implementation of various embodiments of network nodes described herein.

FIG. 19 is a schematic block diagram illustrating a virtualization environment 1900 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1900 hosted by one or more of hardware nodes 1930. Further, in embodiments in which the virtual node is not a radio access node or does not require radio connectivity (e.g., a core network node), then the network node can be entirely virtualized.

The functions can be implemented by one or more applications 1920 (which can alternatively be called software instances, virtual appliances, network functions, virtual nodes, virtual network functions, etc.) operative to implement some of the features, functions, and/or benefits of some of the embodiments disclosed herein. Applications 1920 are run in virtualization environment 1900 which provides hardware 1930 comprising processing circuitry 1960 and memory 1990. Memory 1990 contains instructions 1995 executable by processing circuitry 1960 whereby application 1920 is operative to provide one or more of the features, benefits, and/or functions disclosed herein.

Virtualization environment 1900 can include general-purpose or special-purpose network hardware devices (or nodes) 1930 comprising a set of one or more processors or processing circuitry 1960, which can be commercial off-the-shelf (COTS) processors, dedicated Application Specific Integrated Circuits (ASICs), or any other type of processing circuitry including digital or analog hardware components or special purpose processors. Each hardware device can comprise memory 1990-1 which can be non-persistent memory for temporarily storing instructions 1995 or software executed by processing circuitry 1960. For example, instructions 1995 can include program instructions (also referred to as a computer program product) that, when executed by processing circuitry 1960, can configure hardware node 1920 to perform operations corresponding to various exemplary methods (e.g., procedures) described herein. Such operations can also be attributed to virtual node(s) 1920 that is/are hosted by hardware node 1930.

Each hardware device can comprise one or more network interface controllers (NICs) 1970, also known as network interface cards, which include physical network interface 1980. Each hardware device can also include non-transitory, persistent, machine-readable storage media 1990-2 having stored therein software 1995 and/or instructions executable by processing circuitry 1960. Software 1995 can include any type of software including software for instantiating one or more virtualization layers 1950 (also referred to as hypervisors), software to execute virtual machines 1940 as well as software allowing it to execute functions, features and/or benefits described in relation with some embodiments described herein.

Virtual machines 1940, comprise virtual processing, virtual memory, virtual networking or interface and virtual storage, and can be run by a corresponding virtualization layer 1950 or hypervisor. Different embodiments of the instance of virtual appliance 1920 can be implemented on one or more of virtual machines 1940, and the implementations can be made in different ways.

During operation, processing circuitry 1960 executes software 1995 to instantiate the hypervisor or virtualization layer 1950, which can sometimes be referred to as a virtual machine monitor (VMM). Virtualization layer 1950 can present a virtual operating platform that appears like networking hardware to virtual machine 1940.

As shown in FIG. 19, hardware 1930 can be a standalone network node with generic or specific components. Hardware 1930 can comprise antenna 19225 and can implement some functions via virtualization. Alternatively, hardware 1930 can be part of a larger cluster of hardware (e.g., such as in a data center or customer premise equipment (CPE)) where many hardware nodes work together and are managed via management and orchestration (MANO) 19100, which, among others, oversees lifecycle management of applications 1920.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 1940 can be a software implementation of a physical machine that runs programs as if they were executing on a physical, non-virtualized machine. Each of virtual machines 1940, and that part of hardware 1930 that executes that virtual machine, be it hardware dedicated to that virtual machine and/or hardware shared by that virtual machine with others of the virtual machines 1940, forms a separate virtual network elements (VNE).

Still in the context of NFV, Virtual Network Function (VNF) is responsible for handling specific network functions that run in one or more virtual machines 1940 on top of hardware networking infrastructure 1930 and corresponds to application 1920 in FIG. 19.

In some embodiments, one or more radio units 19200 that each include one or more transmitters 19220 and one or more receivers 19210 can be coupled to one or more antennas 19225. Radio units 19200 can communicate directly with hardware nodes 1930 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 19230, which can alternatively be used for communication between the hardware nodes 1930 and radio units 19200.

Figure 20:
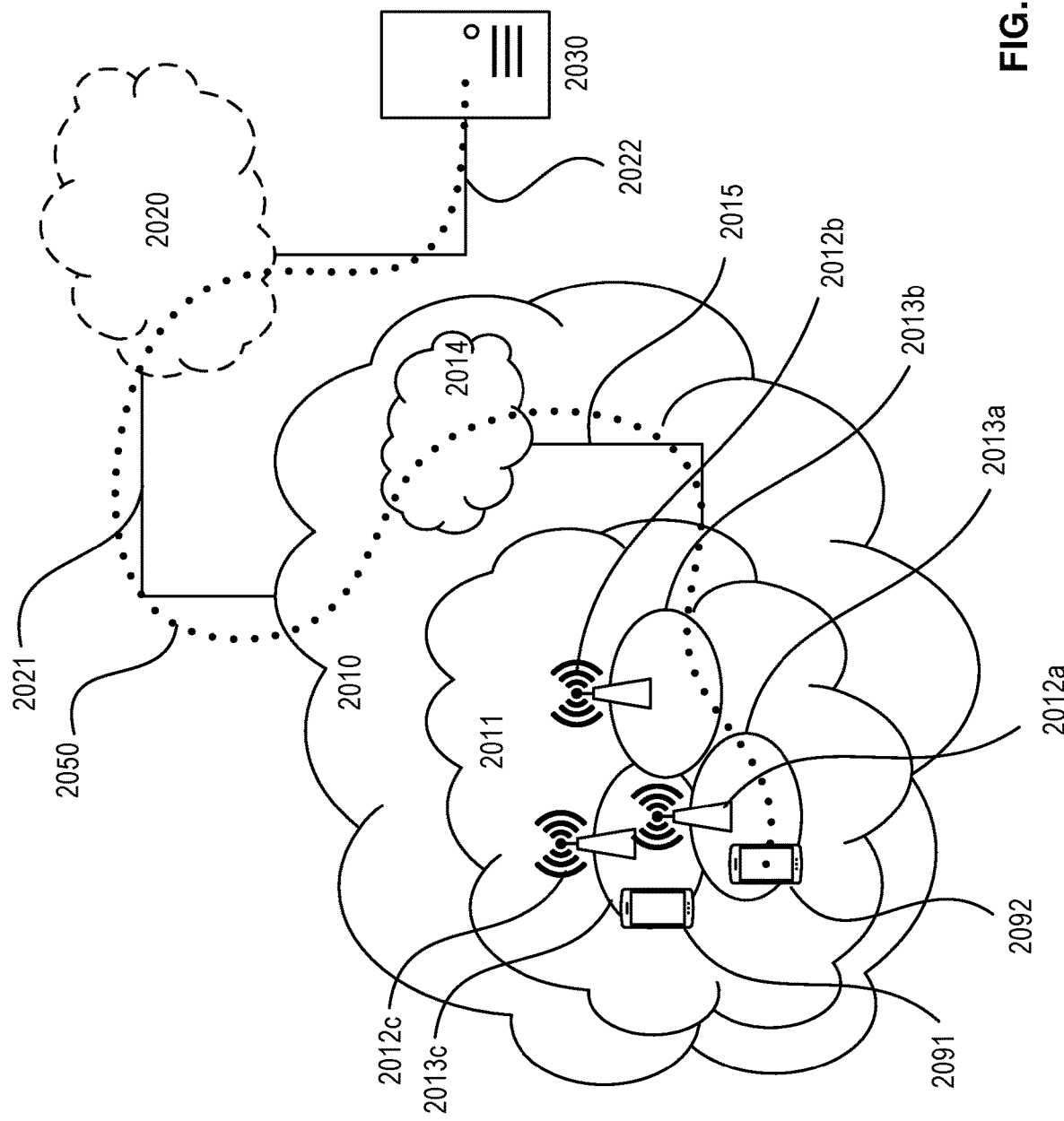
FIGS. 20-21 are block diagrams of various exemplary communication systems and/or networks, in accordance with various aspects described herein.

With reference to FIG. 20, in accordance with an embodiment, a communication system includes telecommunication network 2010, such as a 3GPP-type cellular network, which comprises access network 2011, such as a radio access network, and core network 2014. Access network 2011 comprises a plurality of base stations 2012*a*, 2012*b*, 2012*c*, such as NBs, eNBs, gNBs or other types of wireless access points, each defining a corresponding coverage area 2013*a*, 2013*b*, 2013*c*. Each base station 2012*a*, 2012*b*, 2012*c* is connectable to core network 2014 over a wired or wireless connection 2015. A first UE 2081 located in coverage area 2013*c* can be configured to wirelessly connect to, or be paged by, the corresponding base station 2012*c*. A second UE 2082 in coverage area 2013*a* is wirelessly connectable to the corresponding base station 2012*a*. While a plurality of UEs 2081, 2082 are illustrated in this example, the disclosed embodiments are equally applicable to a situation where a sole UE is in the coverage area or where a sole UE is connecting to the telecommunication network 2010.

Telecommunication network 2010 is itself connected to host computer 2030, which can be embodied in the hardware and/or software of a standalone server, a cloud-implemented server, a distributed server or as processing resources in a server farm. Host computer 2030 can be under the ownership or control of a service provider or can be operated by or on behalf of the service provider. Connections 2021 and 2022 between telecommunication network 2010 and host computer 2030 can extend directly from core network 2014 to host computer 2030 or can go via an optional intermediate network 2020. Intermediate network 2020 can be one of, or a combination of more than one of, a public, private or hosted network; intermediate network 2020, if any, can be a backbone network or the Internet; in particular, intermediate network 2020 can comprise two or more sub-networks (not shown).

The communication system of FIG. 20 as a whole enables connectivity between the connected UEs 2081, 2082 and host computer 2030. The connectivity can be described as an over-the-top (OTT) connection 2050. Host computer 2030 and the connected UEs 2081, 2082 are configured to communicate data and/or signaling via OTT connection 2050, using access network 2011, core network 2014, any intermediate network 2020 and possible further infrastructure (not shown) as intermediaries. OTT connection 2050 can be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2081. Similarly, base station 2012 need not be aware of the future routing of an outgoing uplink communication originating from the UE 2081 towards the host computer 2030.

Example implementations, in accordance with an embodiment, of the UE, base station and host computer discussed in the preceding paragraphs will now be described with reference to FIG. 21. In communication system 2100, host computer 2110 comprises hardware 2115 including communication interface 2116 configured to set up and maintain a wired or wireless connection with an interface of a different communication device of communication system 2100. Host computer 2110 further comprises processing circuitry 2118, which can have storage and/or processing capabilities. In particular, processing circuitry 2118 can comprise one or more programmable processors, application-specific integrated circuits, field programmable gate arrays or combinations of these (not shown) adapted to execute instructions. Host computer 2110 further comprises software 2111, which is stored in or accessible by host computer 2110 and executable by processing circuitry 2118. Software 2111 includes host application 2112. Host application 2112 can be operable to provide a service to a remote user, such as UE 2130 connecting via OTT connection 2150 terminating at UE 2130 and host computer 2110. In providing the service to the remote user, host application 2112 can provide user data which is transmitted using OTT connection 2150.

Communication system 2100 can also include base station 2120 provided in a telecommunication system and comprising hardware 2125 enabling it to communicate with host computer 2110 and with UE 2130. Hardware 2125 can include communication interface 2126 for setting up and maintaining a wired or wireless connection with an interface of a different communication device of communication system 2100, as well as radio interface 2127 for setting up and maintaining at least wireless connection 2170 with UE 2130 located in a coverage area (not shown in FIG. 21) served by base station 2120. Communication interface 2126 can be configured to facilitate connection 2160 to host computer 2110. Connection 2160 can be direct, or it can pass through a core network (not shown in FIG. 21) of the telecommunication system and/or through one or more intermediate networks outside the telecommunication system. In the embodiment shown, hardware 2125 of base station 2120 can also include processing circuitry 2128, which can comprise one or more programmable processors, application-specific integrated circuits, field programmable gate arrays or combinations of these (not shown) adapted to execute instructions.

Base station 2120 also includes software 2121 stored internally or accessible via an external connection. For example, software 2121 can include program instructions (also referred to as a computer program product) that, when executed by processing circuitry 2128, can configure base station 2120 to perform operations corresponding to various exemplary methods (e.g., procedures) described herein.

Communication system 2100 can also include UE 2130 already referred to, whose hardware 2135 can include radio interface 2137 configured to set up and maintain wireless connection 2170 with a base station serving a coverage area in which UE 2130 is currently located. Hardware 2135 of UE 2130 can also include processing circuitry 2138, which can comprise one or more programmable processors, application-specific integrated circuits, field programmable gate arrays or combinations of these (not shown) adapted to execute instructions.

UE 2130 also includes software 2131, which is stored in or accessible by UE 2130 and executable by processing circuitry 2138. Software 2131 includes client application 2132. Client application 2132 can be operable to provide a service to a human or non-human user via UE 2130, with the support of host computer 2110. In host computer 2110, an executing host application 2112 can communicate with the executing client application 2132 via OTT connection 2150 terminating at UE 2130 and host computer 2110. In providing the service to the user, client application 2132 can receive request data from host application 2112 and provide user data in response to the request data. OTT connection 2150 can transfer both the request data and the user data. Client application 2132 can interact with the user to generate the user data that it provides. Software 2131 can also include program instructions (also referred to as a computer program product) that, when executed by processing circuitry 2138, can configure UE 2130 to perform operations corresponding to various exemplary methods (e.g., procedures) described herein.

Figure 21:
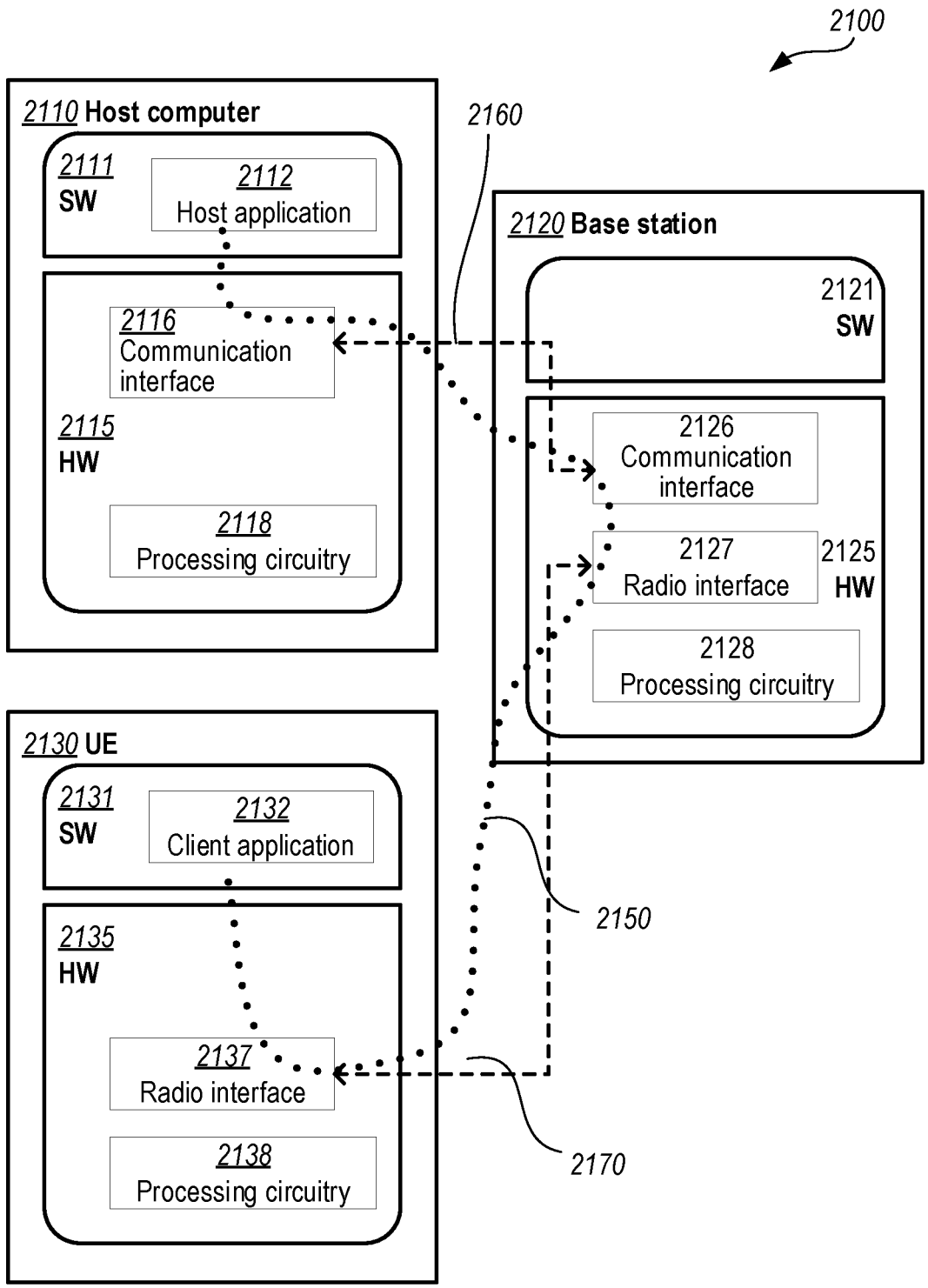

It is noted that host computer 2110, base station 2120 and UE 2130 illustrated in FIG. 21 can be similar or identical to host computer 2030, one of base stations 2012a, 2012b, 2012c and one of UEs 2091, 2092 of FIG. 20, respectively. This is to say, the inner workings of these entities can be as shown in FIG. 21 and independently, the surrounding network topology can be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure can determine the routing, which it can be configured to hide from UE 2130 or from the service provider operating host computer 2110, or both. While OTT connection 2150 is active, the network infrastructure can further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2150 between host computer 2110 and UE 2130, in response to variations in the measurement results. The measurement procedure and/or the network functionality for reconfiguring OTT connection 2150 can be implemented in software 2111 and hardware 2115 of host computer 2110 or in software 2131 and hardware 2135 of UE 2130, or both. In embodiments, sensors (not shown) can be deployed in or in association with communication devices through which OTT connection 2150 passes; the sensors can participate in the measurement procedure by supplying values of the monitored quantities exemplified above, or supplying values of other physical quantities from which software 2111, 2131 can compute or estimate the monitored quantities. The reconfiguring of OTT connection 2150 can include message format, retransmission settings, preferred routing etc.; the reconfiguring need not affect base station 2120, and it can be unknown or imperceptible to base station 2120. Such procedures and functionalities can be known and practiced in the art. In certain embodiments, measurements can involve proprietary UE signaling facilitating host computer 2110's measurements of throughput, propagation times, latency and the like. The measurements can be implemented in that software 2111 and 2131 causes messages to be transmitted, in particular empty or 'dummy' messages, using OTT connection 2150 while it monitors propagation times, errors, etc.

FIG. 22 is a flowchart illustrating an exemplary method and/or procedure implemented in a communication system, in accordance with one embodiment. The communication system includes a host computer, a base station and a UE which, in some exemplary embodiments, can be those described with reference to other figures herein. For simplicity of the present disclosure, only drawing references to FIG. 22 will be included in this section. In step 2210, the host computer provides user data. In substep 2211 (which can be optional) of step 2210, the host computer provides the user data by executing a host application. In step 2220, the host computer initiates a transmission carrying the user data to the UE. In step 2230 (which can be optional), the base station transmits to the UE the user data which was carried in the transmission that the host computer initiated, in accordance with the teachings of the embodiments described throughout this disclosure. In step 2240 (which can also be optional), the UE executes a client application associated with the host application executed by the host computer.

FIG. 23 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission can pass via the base station, in accordance with the teachings of the embodiments described throughout this disclosure. In step 2330 (which can be optional), the UE receives the user data carried in the transmission.

FIG. 24 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 24 will be included in this section. In step 2410 (which can be optional), the UE receives input data provided by the host computer. Additionally or alternatively, in step 2420, the UE provides user data. In substep 2421 (which can be optional) of step 2420, the UE provides the user data by executing a client application. In substep 2411 (which can be optional) of step 2410, the UE executes a client application which provides the user data in reaction to the received input data provided by the host computer. In providing the user data, the executed client application can further consider user input received from the user. Regardless of the specific manner in which the user data was provided, the UE initiates, in substep 2430 (which can be optional), transmission of the user data to the host computer. In step 2440 of the method, the host computer receives the user data transmitted from the UE, in accordance with the teachings of the embodiments described throughout this disclosure.

FIG. 25 is a flowchart illustrating an exemplary method and/or procedure implemented in a communication system, in accordance with one embodiment. The communication system includes a host computer, a base station and a UE which can be those described with reference to other figures herein. For simplicity of the present disclosure, only drawing references to FIG. 25 will be included in this section. In step 2510 (which can be optional), in accordance with the teachings of the embodiments described throughout this disclosure, the base station receives user data from the UE. In step 2520 (which can be optional), the base station initiates transmission of the received user data to the host computer. In step 2530 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

Example embodiments of the methods, apparatus, and computer-readable media described herein include, but are not limited to, the following enumerated examples:

E1. A method, performed by a user equipment (UE), for performing measurements on a secondary cell group (SCG) in a wireless network while the SCG is in a suspended state, the method comprising:
receiving, from a network node in the wireless network, a message including one or more of the following:
an indication that the SCG should be suspended, and
a first SCG measurement configuration to be used while the SCG is suspended;
suspending the SCG and, while the SCG is suspended, performing measurements on the SCG according to a measurement configuration, which is one of the following:
the first SCG measurement configuration, or
a second SCG measurement configuration, if the first SCG measurement configuration was not received in the message;
transmitting the SCG measurements to the network node or a further network node.

E2. The method of embodiment E1, wherein the message is received from one of the following:
a master node (MN) providing the UE's master cell group (MCG);
a secondary node (SN) providing the SCG; or
the SN, as embedded in a message from the MN.

E3. The method of any of embodiments E1-E2, wherein the second SCG measurement configuration is a measurement configuration to be used while the SCG is in an activated state, prior to suspension, and also while the SCG is suspended.

E4. The method of any of embodiments E1-E3, wherein the measurement configuration comprises a measurement reporting configuration that includes one or more conditions for triggering UE reporting of the SCG measurements.

E5. The method of embodiment E4, wherein:
the conditions include on request by the wireless network;
the method further comprises receiving, from the network node, a request for the SCG measurements; and
the SCG measurements are transmitted to the network node in response to the request.

E6. The method of embodiment E4, wherein:
the conditions include receiving a command related to the SCG from the wireless network;
the method further comprises receiving, from the network node while the SCG is suspended, a command to perform one of the following:
activate the SCG,
reconfigure the SCG, or
release the SCG; and
the SCG measurements are transmitted in response to the command.

E7. The method of embodiment E4, wherein:
the conditions include at least one condition related to uplink (UL) data at the UE;
the method further comprises detecting the occurrence of at least one of the following: arrival of UL data belonging to an SCG-terminated bearer, and an amount of available UL data exceeds one or more thresholds; and
the SCG measurements are transmitted in response to the detection.

E8. The method of any of embodiments E1-E3, wherein the method further comprises: detecting the occurrence of at least one of the following:
arrival of UL data belonging to an SCG-terminated bearer, and
an amount of available UL data exceeds one or more thresholds; and
based on detecting the occurrence transmitting, to the network node, a request to activate the SCG.

E9. The method of embodiment E8, wherein the SCG measurements are transmitted in the same message as the request to activate the SCG.

E10. The method of any of embodiments E1-E9, wherein the SCG measurements are performed in response to receiving one of the following:
the indication that the SCG should be suspended; or
an explicit indication to initiate the SCG measurements, included in a further message.

E11. A method, performed by a network node in a wireless network, for configuring user equipment (UE) measurements on a secondary cell group (SCG) while the SCG is in a suspended state, the method comprising:
transmitting, to the UE, a message including one or more of the following:
an indication that the UE's SCG should be suspended, and
a first SCG measurement configuration to be used by the UE while the SCG is suspended;
receiving, from the UE, SCG measurements performed according to a measurement configuration, which is one of the following:
the first SCG measurement configuration, or
a second SCG measurement configuration, if the first SCG measurement configuration was not received in the message.

E12. The method of embodiment E11, wherein the message is transmitted by one of the following:
a master node (MN) providing the UE's master cell group (MCG);
a secondary node (SN) providing the SCG; or
the MN but includes an embedded message received from the SN.

E13. The method of any of embodiments E11-E12, wherein the second SCG measurement configuration is a measurement configuration to be used while the SCG is in an activated state, prior to suspension, and also while the SCG is suspended.

E14. The method of any of embodiments E11-E13, wherein the measurement configuration comprises a measurement reporting configuration that includes one or more conditions for triggering UE reporting of the SCG measurements.

E15. The method of embodiment E14, wherein:
the conditions include on request by the wireless network;
the method further comprises transmitting, to the UE, a request for the SCG measurements; and
the SCG measurements are received from the UE in response to the request.

E15. The method of embodiment E14, wherein:
the conditions include receiving a command related to the SCG from the wireless network;
the method further comprises transmitting, to the UE while the SCG is suspended, a command to perform one of the following:
activate the SCG,
reconfigure the SCG, or
release the SCG; and
the SCG measurements are received from the UE in response to the command.

E16. The method of embodiment E14, wherein the conditions include at least of the following:
  arrival of uplink (UL) data, at the UE, belonging to an SCG-terminated bearer, and
  an amount of available UL data, at the UE, exceeds one or more thresholds.
E17. The method of any of embodiments E11-E13, further comprising receiving, from the UE, a request to activate the SCG, wherein the SCG measurements are received in the same message as the request to activate the SCG.
E18. The method of any of embodiments E11-E18, further comprising sending, to the UE, a request to initiate the SCG measurements, wherein the request is one of the following:
  the indication that the SCG should be suspended; or
  an explicit indication to initiate the SCG measurements, included in a further message.
E19. A user equipment (UE) configured to perform measurements on a secondary cell group (SCG) in a wireless network while the SCG is in a suspended state, the UE comprising:
  radio interface circuitry configured to communicate with at least one network node in the wireless network; and
  processing circuitry operatively coupled to the radio interface circuitry, whereby the processing circuitry and the radio interface circuitry are configured to perform operations corresponding to any of the methods of embodiments E1-E10.
E21. A user equipment (UE) configured to perform measurements on a secondary cell group (SCG) in a wireless network while the SCG is in a suspended state, the UE being arranged to perform operations corresponding to any of the methods of embodiments E1-E10.
E22. A non-transitory, computer-readable medium storing computer-executable instructions that, when executed by processing circuitry of a user equipment (UE), configure the UE to perform operations corresponding to any of the methods of embodiments E1-E10.
E23. A computer program product comprising computer-executable instructions that, when executed by at least one processor of a user equipment (UE), configure the UE to perform operations corresponding to any of the methods of embodiments E1-E10.
E24. A network node, in a wireless network, arranged to configure user equipment (UE) measurements on a secondary cell group (SCG) while the SCG is in a suspended state, the network node comprising:
  radio interface circuitry configured to communicate with the UE; and
  processing circuitry operatively coupled to the radio interface circuitry, whereby the processing circuitry and the radio interface circuitry are configured to perform operations corresponding to any of the methods of embodiments E11-E18.
E25. A network node, in a wireless network, arranged to configure user equipment (UE) measurements on a secondary cell group (SCG) while the SCG is in a suspended state, the network node being further arranged to perform operations corresponding to any of the methods of embodiments E11-E18.
E26. A non-transitory, computer-readable medium storing computer-executable instructions that, when executed by processing circuitry of a network node in a wireless network, configure the network node to perform operations corresponding to any of the methods of embodiments E11-E18.
E27. A computer program product comprising computer-executable instructions that, when executed by processing circuitry of a network node in a wireless network, configure the network node to perform operations corresponding to any of the methods of embodiments E11-E18.

The invention claimed is:

1. A method for a user equipment (UE) to perform measurements on the UE's secondary cell group (SCG) in a wireless network while the UE is in RRC_CONNECTED state and the SCG is suspended, the method comprising:
  receiving, from a network node in the wireless network, a message including an indication that the SCG should be suspended by the UE;
  suspending the SCG in response to the message;
  performing measurements on the suspended SCG according to an SCG measurement configuration, which is one of the following:
    a first SCG measurement configuration included in the message; or
    a second SCG measurement configuration applicable before the SCG was suspended; and
  upon detecting occurrence of one or more reporting conditions when the SCG is being activated or is to be activated, reporting to the network node the measurements performed on the suspended SCG according to the SCG measurement configuration.

2. The method of claim 1, wherein the message is received from one of the following:
  a master node (MN) providing the UE's master cell group (MCG);
  a secondary node (SN) providing the SCG; or
  the MN including content generated by the SN.

3. The method of claim 1, further comprising, before receiving the message, performing measurements on the SCG according to the second SCG measurement configuration.

4. The method of claim 1, wherein the one or more reporting conditions are included in the SCG measurement configuration.

5. The method of claim 1, wherein detecting the occurrence of one or more reporting conditions comprises receiving, from the network node, a request for measurements performed on the suspended SCG.

6. The method of claim 1, wherein:
  detecting the occurrence of one or more reporting conditions comprises receiving, from the network node, a command to perform one of the following:
    activate the SCG,
    reconfigure the SCG, or
    release the SCG; and
  the command includes an explicit request to report the measurements on the suspended SCG upon performing the action associated with the command.

7. The method of claim 1, wherein detecting the occurrence of one or more reporting conditions comprises detecting at least one of the following:
  arrival of uplink (UL) data, at the UE, belonging to a bearer associated with the SCG;
  an amount of available UL data, at the UE, exceeds one or more thresholds;
  the measurements on the suspended SCG fulfill a first predetermined threshold or condition; and the measurements on the suspended SCG do not fulfill a second predetermined threshold or condition.

8. The method of claim 7, wherein:
reporting the measurements performed on the suspended SCG comprises transmitting, to the network node, a first request to resume the suspended SCG; and
the measurements are included with the first request.

9. The method of claim 7, wherein reporting the measurements performed on the suspended SCG comprises:
transmitting, to the network node, a first request to resume the suspended SCG;
receiving, from the network node, a second request for the measurements performed on the suspended SCG; and
reporting the measurements to the network node in response to the second request.

10. A user equipment (UE) configured to perform measurements on the UE's secondary cell group (SCG) in a wireless network while the UE is in RRC_CONNECTED state and the SCG is suspended, the UE comprising:
radio interface circuitry configured to communicate with at least one network node in the wireless network; and
processing circuitry operatively coupled to the radio interface circuitry, whereby the processing circuitry and the radio interface circuitry are configured to perform operations corresponding to the method of claim 1.

11. A method for a network node to receive user equipment (UE) measurements on the UE's secondary cell group (SCG) in a wireless network performed while the UE is in RRC_CONNECTED state and the UE's SCG is suspended, the method comprising:
transmitting, to the UE, a message including an indication that the UE's SCG should be suspended by the UE; and
receiving, from the UE, measurements performed by the UE on the UE's SCG while the UE's SCG is suspended, wherein the measurements are based on one of the following:
a first SCG measurement configuration included in the message; or
a second SCG measurement configuration applicable before the UE's SCG was suspended by the UE,
wherein the measurements performed on the UE's SCG while suspended are received in response to the UE detecting one or more reporting conditions that occur when the UE's SCG is being activated or is to be activated while suspended.

12. The method of claim 11, wherein the message is transmitted by one of the following:
a master node (MN) providing the UE's master cell group (MCG);
a secondary node (SN) providing the UE's SCG; or
the MN including content generated by the SN.

13. The method of claim 11, further comprising receiving, from the UE before transmitting the message, one or more reports of measurements performed by the UE on the UE's SCG according to the second SCG measurement configuration.

14. The method of claim 11, wherein the one or more reporting conditions are included in the SCG measurement configuration.

15. The method of claim 11, wherein:
the method further comprises transmitting, to the UE, a request for measurements performed by the UE on the UE's SCG while suspended; and
the measurements are received from the UE in response to the request.

16. The method of claim 11, wherein:
the method further comprises transmitting, to the UE while the UE's SCG is suspended, a command to perform one of the following actions:
activate the UE's SCG,
reconfigure the UE's SCG, or
release the UE's SCG;
the command includes an explicit request to report the measurements on the UE's SCG while suspended, upon performing the action associated with the command; and
the measurements are received from the UE in response to the command.

17. The method of claim 11, wherein the measurements are received based on the UE detecting at least one of the following:
arrival of uplink (UL) data, at the UE, belonging to a bearer associated with the UE's SCG;
an amount of available UL data, at the UE, exceeds one or more thresholds;
the measurements fulfill a first predetermined threshold or condition; and
the measurements do not fulfill a second predetermined threshold or condition.

18. The method of claim 17, wherein receiving the measurements comprises receiving, from the UE, a first request to resume the suspended SCG, wherein the measurements are included with the first request.

19. The method of claim 17, wherein receiving the measurements comprises:
receiving, from the UE while the UE's SCG is suspended, a first request to resume the UE's SCG;
transmitting, to the UE, a second request for the measurements performed on the UE's SCG while suspended; and
receiving the measurements from the UE in response to the second request.

20. A network node configured to receive user equipment (UE) measurements on the UE's secondary cell group (SCG) in a wireless network performed while the SCG is suspended, the network node comprising:
radio interface circuitry configured to communicate with the UE; and
processing circuitry operatively coupled to the radio interface circuitry, whereby the processing circuitry and the radio interface circuitry are configured to perform operations corresponding to the method of claim 11.

* * * * *